United States Patent
Zhou et al.

(10) Patent No.: US 12,548,772 B2
(45) Date of Patent: *Feb. 10, 2026

(54) POSITIVE ELECTRODE SHEET, SECONDARY BATTERY, BATTERY MODULE, BATTERY PACK AND ELECTRICAL APPARATUS

(71) Applicant: CONTEMPORARY AMPEREX TECHNOLOGY (HONG KONG) LIMITED, Hong Kong (CN)

(72) Inventors: Xiang Zhou, Ningde (CN); Yao Jiang, Ningde (CN); Jiang Liu, Ningde (CN); Baiqing Li, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/669,469

(22) Filed: May 20, 2024

(65) Prior Publication Data

US 2024/0322165 A1 Sep. 26, 2024

Related U.S. Application Data

(60) Division of application No. 18/363,989, filed on Aug. 2, 2023, which is a continuation of application No. PCT/CN2022/079295, filed on Mar. 4, 2022.

(51) Int. Cl.
| | |
|---|---|
| H01M 4/58 | (2010.01) |
| H01M 4/131 | (2010.01) |
| H01M 4/36 | (2006.01) |
| H01M 4/505 | (2010.01) |
| H01M 4/525 | (2010.01) |
| H01M 4/62 | (2006.01) |
| H01M 4/02 | (2006.01) |
| H01M 4/64 | (2006.01) |
| H01M 10/0525 | (2010.01) |

(52) U.S. Cl.
CPC ......... *H01M 4/5825* (2013.01); *H01M 4/131* (2013.01); *H01M 4/366* (2013.01); *H01M 4/505* (2013.01); *H01M 4/525* (2013.01); *H01M 4/582* (2013.01); *H01M 4/625* (2013.01); *H01M 2004/021* (2013.01); *H01M 2004/028* (2013.01); *H01M 4/64* (2013.01); *H01M 10/0525* (2013.01)

(58) Field of Classification Search
CPC .... H01M 4/5825; H01M 4/366; H01M 4/525; H01M 4/505; H01M 4/58; H01M 4/582; H01M 4/64; H01M 4/625; H01M 2004/028; H01M 4/136; H01M 4/131

See application file for complete search history.

(56) References Cited

U.S. PATENT DOCUMENTS

| | | |
|---|---|---|
| 9,005,810 B2 | 4/2015 | Ohira et al. |
| 2012/0028120 A1 | 2/2012 | Huang et al. |
| 2012/0305835 A1 | 12/2012 | Yamaguchi |
| 2013/0209886 A1* | 8/2013 | Ohira ............... H01M 4/5825 252/500 |
| 2015/0311522 A1 | 10/2015 | Fang et al. |
| 2015/0311527 A1 | 10/2015 | Khot et al. |
| 2015/0372302 A1 | 12/2015 | Li et al. |
| 2016/0190584 A1* | 6/2016 | Wu ............... H01M 4/5825 252/182.1 |
| 2017/0365859 A1 | 12/2017 | Park et al. |
| 2018/0166679 A1 | 6/2018 | Ophir et al. |
| 2020/0161623 A1 | 5/2020 | Wang et al. |
| 2023/0335723 A1 | 10/2023 | Ma et al. |
| 2023/0343938 A1 | 10/2023 | Ma et al. |
| 2023/0361296 A1 | 11/2023 | Jiang et al. |
| 2023/0402594 A1 | 12/2023 | Natsui et al. |

FOREIGN PATENT DOCUMENTS

| | | |
|---|---|---|
| CN | 101339994 A | 1/2009 |
| CN | 101369657 A | 2/2009 |
| CN | 101707248 A | 5/2010 |
| CN | 101339994 B | 12/2010 |

(Continued)

OTHER PUBLICATIONS

International Search Report dated Nov. 25, 2022 for Application No. PCT/CN2022/079295.
Written Opinion dated Nov. 25, 2022 for Application No. PCT/CN2022/079295.
Extended European Search Report for Application No. 22902499, dated May 29, 2024, 7 pages.
United States Office Action for U.S. Appl. No. 18/363,989, dated Mar. 7, 2024, 30 pages.

(Continued)

*Primary Examiner* — Laura Weiner
(74) *Attorney, Agent, or Firm* — Ladas & Parry LLP

(57) ABSTRACT

A positive electrode sheet, a secondary battery, a battery module, a battery pack and an electrical apparatus are described. The positive electrode sheet includes a positive electrode current collector and a positive electrode film layer arranged on at least one surface of the positive electrode current collector and having a single-layer or multi-layer structure. When the positive electrode film layer is of the single-layer structure, at least one positive electrode film layer comprises both a first positive electrode active material and a second positive electrode active material with a chemical formula of $Li_aA_xMn_{1-y}R_yP_{1-z}C_zO_{4-n}D_n$; and/or, when the positive electrode film layer is of the multi-layer structure, at least one layer of the at least one positive electrode film layer includes both a first and second positive electrode active material. The secondary battery made of the positive electrode sheet has high energy density and high battery cell rate performance.

16 Claims, 9 Drawing Sheets

(56) References Cited

FOREIGN PATENT DOCUMENTS

| | | |
|---|---|---|
| CN | 102427123 A | 4/2012 |
| CN | 102456881 A | 5/2012 |
| CN | 102754251 A | 10/2012 |
| CN | 103066261 A | 4/2013 |
| CN | 103069624 A | 4/2013 |
| CN | 103346295 A | 10/2013 |
| CN | 103413943 A | 11/2013 |
| CN | 103515594 A | 1/2014 |
| CN | 103682266 A | 3/2014 |
| CN | 103779566 A | 5/2014 |
| CN | 103797622 A | 5/2014 |
| CN | 103811727 A | 5/2014 |
| CN | 103996848 A | 8/2014 |
| CN | 104051720 A | 9/2014 |
| CN | 104143626 A | 11/2014 |
| CN | 104218218 A | 12/2014 |
| CN | 104577115 A | 4/2015 |
| CN | 105118985 A | 12/2015 |
| CN | 103825029 B | 2/2016 |
| CN | 105470493 A | 4/2016 |
| CN | 105810897 A | 7/2016 |
| CN | 105870432 A | 8/2016 |
| CN | 105895887 A | 8/2016 |
| CN | 106058220 A | 10/2016 |
| CN | 106058225 A | 10/2016 |
| CN | 106450337 A | 2/2017 |
| CN | 106816584 A | 6/2017 |
| CN | 107256960 A | 10/2017 |
| CN | 107706402 A | 2/2018 |
| CN | 107895781 A | 4/2018 |
| CN | 109244391 A | 1/2019 |
| CN | 109309207 A | 2/2019 |
| CN | 109560266 A | 4/2019 |
| CN | 109888201 A | 6/2019 |
| CN | 110265627 A | 9/2019 |
| CN | 110416525 A | 11/2019 |
| CN | 110582875 A | 12/2019 |
| CN | 111276693 A | 6/2020 |
| CN | 111430700 A | 7/2020 |
| CN | 111697234 A | 9/2020 |
| CN | 111933915 A | 11/2020 |
| CN | 112447966 A | 3/2021 |
| CN | 112447968 A | 3/2021 |
| CN | 112635722 A | 4/2021 |
| CN | 112864360 A | 5/2021 |
| CN | 108666545 B | 6/2021 |
| CN | 109473675 B | 8/2021 |
| CN | 113224278 A | 8/2021 |
| CN | 113270575 A | 8/2021 |
| CN | 114730910 A | 7/2022 |
| EP | 2615673 A2 | 7/2013 |
| EP | 4280301 A1 | 11/2023 |
| EP | 4401170 A1 | 7/2024 |
| EP | 4418363 A1 | 8/2024 |
| EP | 4451444 A1 | 10/2024 |
| JP | 2002198050 A | 7/2002 |
| JP | 2002279989 A | 9/2002 |
| JP | 2010129332 A | 6/2010 |
| JP | 2013062082 A | 4/2013 |
| JP | 2014082050 A | 5/2014 |
| JP | 2015118742 A | 6/2015 |
| JP | 2015210917 A | 11/2015 |
| JP | 6157563 B2 | 7/2017 |
| JP | 2021009838 A | 1/2021 |
| KR | 20160109666 A | 9/2016 |
| RU | 2269185 C2 | 1/2006 |
| RU | 2536649 C2 | 1/2006 |
| RU | 2361326 C2 | 7/2009 |
| WO | 2004095607 A2 | 11/2004 |
| WO | 2009144600 A2 | 12/2009 |
| WO | 2012147929 A1 | 11/2012 |
| WO | 2013052494 A1 | 4/2013 |

OTHER PUBLICATIONS

United States Office Action for U.S. Appl. No. 18/363,989, dated Jul. 3, 2024, 43 pages.
Extended European Search Report for EP Application No. 22919273.7, dated Mar. 14, 2024, 5 pages.
Zhao, De, et al., Synthesis of B Doped $Li_{1+2x}Mn_{0.8}Fe_{0.2}P_{1-x}B_xO_4$ as Cathode Material for Lithium Ion Battery, CNKI, Dec. 12, 2016, 8 pages.
International Search Report for Application No. PCT/CN2022/084258, mailed on Dec. 21, 2022, 7 pages.
Partial Supplementary European Search Report for EP Application No. 22882990.9, mailed on Dec. 11, 2024, 23 pages.
US Final Office Action for U.S. Appl. No. 18/351,925, mailed on Mar. 27, 2025, 19 pages.
Japan Office Action for Application No. 2023-543271, drafted Sep. 24, 2024, 11 pages.
Korea Office Action for Application No. 10-2023-7024611, sent May 9, 2025, 9 pages.
Zhang, Jun et al., Tailoring the sodium doped $LiMnPO_4$/C orthophosphate to nanoscale as a high-performance cathode for lithium ion battery, Applied Surface Science 530 (2020) 146628, 8 pages.
US Non-Final Office Action for U.S. Appl. No. 18/351,925, mailed on Dec. 5, 2024, 25 pages.
Russia Office Action for Application No. 2023118580, dated Dec. 18, 2023, 11 pages.
Russia Office Action for Application No. 2024111495, dated Jan. 21, 2025, 10 pages.
International Search Report for Application No. PCT/CN2022/126778, dated Jan. 16, 2023, 4 pages.
China First Office Action for Application No. 202280012894.9, dated Apr. 11, 2024, 6 pages.
International Written Opinion for Application No. PCT/CN2022/105998, dated Dec. 16, 2022, 8 pages.
Notice of Reasons for Refusal in Japanese Application No. 2024-542171, issued on Jun. 11, 2025.
Office Action in U.S. Appl. No. 18/363,989, issued on Jun. 12, 2025.
Notice of Allowance in Chinese Application No. 202280007637.6, issued on Aug. 14, 2024.
Office Action in Chinese Application No. 202280007637.6, issued on Apr. 13, 2024.
International Search Report and Written Opinion in International application No. PCT/CN2021/125898, mailed on Jun. 27, 2022.
International Search Report and Written Opinion in International application No. PCT/CN2021/130350, mailed on Jul. 27, 2022.
International Search Report and Written Opinion in International application No. PCT/CN2021/140462, mailed on Aug. 1, 2022.
Extended European Search Report from EP patent application No. 22882990.9, mailed Sep. 18, 2025.
Extended European Search Report from EP patent application No. 22950712.4, mailed Jul. 24, 2025.
"Synthesis and Electrochemical Properties of Na and Mg co-Doped $LiFe_{0.65}Mn_{0.35}PO_4$/C Cathode Materials for Lithium-Ion Batteries," Int. J. Electrochem. Sci., 14, XP093296586, Qiao Shunpan et al., Oct. 29, 2019 (Jul. 16, 2025).
Korean Office Action dated Nov. 21, 2025 for application KR 10-2024-7029374.
Chinese Notice of Allowance dated Nov. 24, 2025 for application CN 202410960327.7.

* cited by examiner

POSITIVE ELECTRODE SHEET, SECONDARY BATTERY, BATTERY MODULE, BATTERY PACK AND ELECTRICAL APPARATUS

CROSS REFERENCE TO RELATED APPLICATIONS

This application is a divisional application of U.S. patent application Ser. No. 18/363,989 filed on Aug. 2, 2023 which is a continuation application of PCT/CN2022/079295, filed on Mar. 4, 2022. The disclosures of which are hereby incorporated by reference in their entirety.

TECHNICAL FIELD

The present application relates to the technical field of secondary batteries, and in particular to a positive electrode sheet, a secondary battery, a battery module, a battery pack and an electrical apparatus.

BACKGROUND ART

In recent years, with the increasingly wide use of secondary batteries, the secondary batteries are widely used in energy storage power systems such as water power, thermal power, wind power and solar power stations, as well as power tools, electric bicycles, electric motorcycles, electric vehicles, military equipment, aerospace and other fields. Due to the great development of the secondary batteries, higher requirements have also been put forward for their energy density, cycling performance and safety performance. Existing lithium manganese iron phosphate is used as a main material and mixed with ternary materials such as lithium nickel cobalt manganese oxide, lithium nickel cobalt aluminum oxide or lithium cobalt oxide to make secondary batteries. Although this technology combines respective advantages of the lithium manganese iron phosphate and the ternary materials, the lithium manganese iron phosphate makes the batteries poor in kinetic performance and low in cell rate performance, which cannot meet the needs of power batteries.

SUMMARY OF THE INVENTION

The present application is made in view of the above-mentioned topics, and the objective is to provide a positive electrode sheet, a secondary battery, a battery module, a battery pack and an electrical apparatus to solve the problems that a secondary battery manufactured from existing positive electrode active materials is low in energy density, low in cell rate performance, poor in kinetic performance, poor in low-temperature performance, short in cycle life and low in safety.

In order to achieve the above objective, a first aspect of the present application provides a positive electrode sheet, including a positive electrode current collector and a positive electrode film layer arranged on at least one surface of the positive electrode current collector; the positive electrode film layer is of a single-layer structure or a multi-layer structure; when the positive electrode film layer is of the single-layer structure, at least one positive electrode film layer comprises both a first positive electrode active material and a second positive electrode active material with a chemical formula of $Li_aA_xMn_{1-y}R_yP_{1-z}C_zO_{4-n}D_n$; and/or, when the positive electrode film layer is of the multi-layer structure, at least one layer of the at least one positive electrode film layer comprises both a first positive electrode active material and a second positive electrode active material with a chemical formula of $Li_aA_xMn_{1-y}R_yP_{1-z}C_zO_{4-n}D_n$; wherein A includes one or more elements selected from Zn, Al, Na, K, Mg, Nb, Mo and W; R includes one or more elements selected from Ti, V, Zr, Fe, Ni, Mg, Co, Ga, Sn, Sb, Nb and Ge; C includes one or more elements selected from B, S, Si and N; D includes one or more elements selected from S, F, Cl and Br; a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1; and the second positive electrode active material is selected from one or more of $LiNi_bCo_cMn_{(1-b-c)}O_2$, $LiNi_bCo_cAl_{(1-b-c)}O_2$ and $LiCoO_2$; wherein b is independently selected from 0.3-0.9 (optionally 0.33-0.8), and the sum of b and c is independently selected from 0.3-0.9 (optionally 0.66-0.9).

Thus, the applicant unexpectedly found that: the first positive electrode active material is obtained by doping particular elements of particular amounts at the Li site, the Mn site, the P site and the O site of a compound $LiMnPO_4$ at the same time, the significantly improved rate performance can be obtained, while the dissolution of Mn and Mn-site doping elements can be significantly reduced, significantly improved cycling performance and/or high-temperature stability can be obtained, the gram capacity and compacted density of the material can also be improved, and interface side reactions are reduced. In this application, the first positive electrode active material and the second positive electrode active material are mixed to be used. The advantages of the two materials are complementary, which improves the energy density of the secondary battery, and at the same time, makes the battery have excellent rate performance, kinetic performance, cycling performance, low-temperature performance and safety. Particles of the first positive electrode active material evenly coat the surface of the second positive electrode active material, so that the second positive electrode active material is relatively independent in lattice and stable in skeleton, and the second positive electrode active material is not prone to collapsing during the charging and discharging process of the secondary battery, which further improves the cycle life of the secondary battery. Moreover, a coating layer formed by the first positive electrode active material provides elastic strain force for external force impact or shear, effectively solving the safety problem of the second positive electrode active material.

A second aspect of the present application provides a positive electrode sheet, including a positive electrode current collector and a positive electrode film layer arranged on at least one surface of the positive electrode current collector; at least one positive electrode film layer is of a multi-layer structure, and any positive electrode film layer having the multi-layer structure comprises a first positive electrode active material and a second positive electrode active material with a chemical formula of $Li_aA_xMn_{1-y}R_yP_{1-z}C_zO_{4-n}D_n$ in different layers respectively; wherein A includes one or more elements selected from Zn, Al, Na, K, Mg, Nb, Mo and W; R includes one or more elements selected from Ti, V, Zr, Fe, Ni, Mg, Co, Ga, Sn, Sb, Nb and Ge; C includes one or more elements selected from B, S, Si and N; D includes one or more elements selected from S, F, Cl and Br; a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1; the second positive electrode active material is selected from one or more of $LiNi_bCo_cMn_{(1-b-c)}O_2$, LiNi- $_b$Co$_c$Al$_{(1-b-c)}$O$_2$ and LiCoO$_2$; wherein b is independently selected from 0.3-0.9 (optionally 0.33-0.8), and the sum of b and c is independently selected from 0.3-0.9 (optionally 0.66-0.9); and optionally, any positive electrode film layer having the multi-layer structure comprises the first positive electrode active material and the second positive electrode active material in adjacent layers respectively.

Thus, the first positive electrode active material has significantly improved rate performance, while significantly reducing the dissolution of Mn and Mn-site doping elements, obtaining significantly improved cycling performance and/or high-temperature stability, also improving the gram capacity and compacted density of the material, and reducing interface side reactions. In this application, the first positive electrode active material and the second positive electrode active material are used in combination. The advantages of the two materials are complementary, which improves the energy density of the secondary battery, and at the same time, makes the secondary battery have excellent rate performance, kinetic performance, cycling performance and low-temperature performance. Moreover, the first positive electrode active material provides elastic strain force for external force impact or shear, which effectively solves the safety problem of the second positive electrode active material.

A third aspect of the present application provides a positive electrode sheet, including a positive electrode current collector and a positive electrode film layer I and a positive electrode film layer II arranged on two surfaces of the positive electrode current collector respectively; the positive electrode film layer I and the positive electrode film layer II are each of a single-layer structure or multi-layer structure independently; at least one layer of the positive electrode film layer I comprises a first positive electrode active material with a chemical formula of Li$_a$A$_x$Mn$_{1-y}$R$_y$P$_{1-z}$C$_z$O$_{4-n}$D$_n$, and at the same time, at least one layer of the positive electrode film layer II comprises a second positive electrode active material; wherein A includes one or more elements selected from Zn, Al, Na, K, Mg, Nb, Mo and W; R includes one or more elements selected from Ti, V, Zr, Fe, Ni, Mg, Co, Ga, Sn, Sb, Nb and Ge; C includes one or more elements selected from B, S, Si and N; D includes one or more elements selected from S, F, Cl and Br; a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1; and the second positive electrode active material is selected from one or more of LiNi$_b$Co$_c$Mn$_{(1-b-c)}$O$_2$, LiNi$_b$Co$_c$Al$_{(1-b-c)}$O$_2$ and LiCoO$_2$; wherein b is independently selected from 0.3-0.9 (optionally 0.33-0.8), and the sum of b and c is independently selected from 0.3-0.9 (optionally 0.66-0.9).

Thus, the first positive electrode active material has significantly improved rate performance, while significantly reducing the dissolution of Mn and Mn-site doping elements, obtaining significantly improved cycling performance and/or high-temperature stability, also improving the gram capacity and compacted density of the material, and reducing interface side reactions. In this application, the first positive electrode active material and the second positive electrode active material are used in combination. The advantages of the two materials are complementary, which improves the energy density of the secondary battery, and at the same time, makes the secondary battery have excellent rate performance, kinetic performance, cycling performance and low-temperature performance. Moreover, the first positive electrode active material provides elastic strain force for external force impact or shear, which effectively solves the safety problem of the second positive electrode active material.

Unless otherwise specified, in the chemical formula Li$_a$A$_x$Mn$_{1-y}$R$_y$P$_{1-z}$C$_z$O$_{4-n}$D$_n$, when A is two or more elements, the definition for the value range of x is not only a definition for the stoichiometric number of each element as A, but also a definition for the sum of the stoichiometric numbers of various elements as A. For example, when A is two or more elements A1, A2 . . . An, the respective stoichiometric numbers x1, x2 . . . xn for A1, A2 . . . An each are required to fall within the numerical range defined for x in the present application, and the sum of x1, x2 . . . xn are also required to fall within this numerical range. Similarly, in the case where B, C and D are each two or more elements, the definition for the numerical ranges of the stoichiometric numbers of R, C and D in the present application also has the above-mentioned meaning.

In any of embodiments of the first aspect to the third aspect, a mass ratio of the first active material to the second active material is 1:7 to 7:1, optionally 1:4 to 4:1, and further optionally 1:3 to 3:1, such as 1:7, 1:5, 1:3, 1:2, 3:5, 1:1, 5:3, 2:1, 3:1, 5:1 and 7:1. Thus it is ensured that the secondary battery has both excellent rate performance and cycling performance, and has high energy density, excellent kinetic performance and low-temperature performance, the interface side reactions are reduced, and the safety of the secondary battery is improved.

In any of embodiments of the first aspect to the third aspect, in the first positive electrode active material, R is selected from at least two of Ti, V, Zr, Fe, Ni, Mg, Co, Ga, Sn, Sb, Nb and Ge. Thus, the composition of the first positive electrode active material can be controlled more accurately.

In any of embodiments of the first aspect to the third aspect, in the first positive electrode active material, A is any element selected from Mg and Nb; and/or, R is selected from at least two of Fe, Ti, V, Co and Mg, optionally Fe and one or more elements selected from Ti, V, Co and Mg; and/or, C is S; and/or, D is F. By selecting the doping elements within the above range, the rate performance and electronic conductivity of the secondary battery can be further improved, thereby improving the rate performance, gram capacity and high-temperature performance of the secondary battery, and reducing the interface side reactions.

In any of embodiments of the first aspect to the third aspect, in the first positive electrode active material, x is selected from a range of 0.001-0.005. By selecting the value of x within this range, the kinetic performance of the first positive electrode active material can be further improved.

In any of embodiments of the first aspect to the third aspect, in the first positive electrode active material, y is selected from a range of 0.01 to 0.5, optionally selected from a range of 0.25 to 0.5. By selecting the value of y within this range, the gram capacity and rate performance of the first positive electrode active material can be further improved.

In any of embodiments of the first aspect to the third aspect, in the first positive electrode active material, z is selected from a range of 0.001 to 0.005. By selecting the value of z within this range, the rate performance of the secondary battery can be further improved.

In any of embodiments of the first aspect to the third aspect, in the first positive electrode active material, n is selected from a range of 0.001 to 0.005. By selecting the value of n within this range, the high-temperature performance of the secondary battery can be further improved.

In any of embodiments of the first aspect to the third aspect, in the first positive electrode active material, a ratio of (1-y) to y is selected from 1-4, optionally selected from 1.5-3. In this way, the energy density and cycling performance of the secondary battery can be further improved.

In any of embodiments of the first aspect to the third aspect, in the first positive electrode active material, a ratio of a to x is selected from 9-1100, optionally selected from 190-998. When this condition is satisfied, the energy density and cycling performance of the secondary battery can be further improved.

In any of embodiments of the first aspect to the third aspect, a lattice change rate of the first positive electrode active material is below 8%, optionally below 4%. By reducing the lattice change rate, it is beneficial to improving the rate performance of the secondary battery. The lattice change rate can be measured by methods known in the art, such as X-ray diffraction spectroscopy (XRD).

In any of embodiments of the first aspect to the third aspect, a Li/Mn antisite defect concentration of the first positive electrode active material is below 2%, optionally below 0.5%. The so-called Li/Mn antisite defect refers to the exchange of the positions of $Li^+$ and $Mn^{2+}$ in the lattice of $LiMnPO_4$. The Li/Mn antisite defect concentration refers to the percentage of $Li^+$ that exchanges with $Mn^{2+}$ relative to the total amount of $Li^+$ in the positive electrode active material. By reducing the Li/Mn antisite defect concentration, it is beneficial to improving the gram capacity and rate performance of the first positive electrode active material. The Li/Mn antisite defect concentration can be measured by methods known in the art, such as XRD.

In any of embodiments of the first aspect to the third aspect, a surface oxygen valence of the first positive electrode active material is below $-1.82$, optionally being $-1.89$ to $-1.98$. By lowering the surface oxygen valence, the interface side reactions between the first positive electrode active material and an electrolyte solution can be reduced, thereby improving the cycling performance and high-temperature stability of the secondary battery. The surface oxygen valence can be measured by methods known in the art, such as by electron energy loss spectroscopy (EELS).

In any of embodiments of the first aspect to the third aspect, the compacted density of the first positive electrode active material at 3 T is 2.0 $g/cm^3$ or more, optionally 2.2 $g/cm^3$ or more. The higher the compacted density is, the greater the weight of the first positive electrode active material per unit volume will be. Therefore, increasing the compacted density is beneficial to the improvement of the volumetric energy density of a battery cell. The compacted density can be measured according to GB/T 24533-2009.

In any of embodiments of the first aspect to the third aspect, the surface of the first positive electrode active material is further coated with carbon. Thereby, the conductivity of the first positive electrode active material can be improved.

In any of embodiments of the first aspect to the third aspect, a ratio of b to (1-b-c) to c in $LiNi_bCo_cMn_{(1-b-c)}O_2$ is 5:2:3 or 3:1:1 or 8:1:1; and/or, a ratio of b to c to (1-b-c) in $LiNi_bCo_cAl_{(1-b-c)}O_2$ is 5:2:3 or 3:1:1 or 8:1:1. Thus, the energy density of the secondary battery can be further improved.

In any of embodiments of the first aspect to the third aspect, the sum of the mass of the first positive electrode active material and the second positive electrode active material accounts for 88%-98.7% of the mass of the positive electrode sheet. Further ensure that the secondary battery has excellent rate performance, kinetic performance, cycling performance and low-temperature performance, and has high energy density.

A fourth aspect of the present application provides a secondary battery, including the positive electrode sheet in any of the first aspect to the third aspect of the present application.

A fifth aspect of the present application provides a battery module, including the secondary battery of the fourth aspect of the present application.

A sixth aspect of the present application provides a battery pack, including the battery module of the fifth aspect of the present application.

A seventh aspect of the present application provides an electrical apparatus, including at least one selected from the secondary battery of the fourth aspect of the present application, the battery module of the fifth aspect of the present application and the battery pack of the sixth aspect of the present application.

Figure 1:
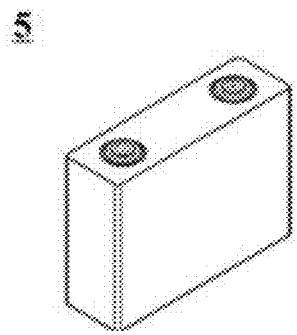
FIG. 1 is a schematic view of a secondary battery according to an embodiment of the present application.

DESCRIPTION OF REFERENCE NUMERALS 1 battery pack; 2 upper box; 3 lower box; 4 battery module; 5 secondary battery; 51 case; 52 electrode assembly; 53 top cover assembly.

DETAILED DESCRIPTION

Hereinafter, embodiments of a positive electrode sheet, a secondary battery, a battery module, a battery pack and an electrical apparatus of the present application are specifically disclosed by referring to the detailed description of the drawings as appropriate. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

If not specifically stated, all steps of the present application may be performed sequentially or randomly, preferably sequentially. For example, the method comprises steps (a) and (b), indicating that the method may include steps (a) and (b) performed sequentially, or may include steps (b) and (a) performed sequentially. For example, when it is mentioned that the method can also include step (c), it means that step (c) can be added to the method in any order. For example, the method can include steps (a), (b), and (c), or steps (a), (c), and (b), or steps (c), (a), and (b).

If not specifically stated, "including" and "comprising" mentioned in the present application indicate open inclusion or closed inclusion. For example, "including" and "comprising" indicate that it is possible to include or comprise other components not listed, and it is also possible to include or comprise only the listed components.

If not specifically stated, the term "or" is inclusive in the present application. By way of example, the phrase "A or B" means "A, B, or both A and B". More particularly, the condition "A or B" is satisfied by any one of the following conditions: A is true (or present) and B is false (or absent); A is false (or absent) and B is true (or present); or both A and B are true (or present).

[Secondary Battery]

Secondary batteries, also known as rechargeable batteries or storage batteries, refer to batteries that, after being discharged, can activate active materials by charging for continuous use.

Typically, a secondary battery comprises a positive electrode sheet, a negative electrode sheet, a separator and an electrolyte solution. During charging and discharging of the battery, active ions (such as lithium ions) are intercalated and deintercalated back and forth between the positive electrode sheet and the negative electrode sheet. The separator is provided between the positive electrode sheet and the negative electrode sheet, and mainly functions to prevent a short circuit between the positive electrode and the negative electrode while allowing active ions to pass through. The electrolyte solution mainly serves to conduct active ions between the positive electrode sheet and the negative electrode sheet.

[Positive Electrode Sheet]

An embodiment of the first aspect of the present application provides a positive electrode sheet, including a positive electrode current collector and a positive electrode film layer arranged on at least one surface of the positive electrode current collector; the positive electrode film layer is of a single-layer structure or a multi-layer structure; when the positive electrode film layer is of the single-layer structure, at least one positive electrode film layer comprises both a first positive electrode active material and a second positive electrode active material with a chemical formula of $Li_aA_xMn_{1-y}R_yP_{1-z}C_zO_{4-n}D_n$; and/or, when the positive electrode film layer is of the multi-layer structure, at least one layer of the at least one positive electrode film layer comprises both a first positive electrode active material and a second positive electrode active material with a chemical formula of $Li_aA_xMn_{1-y}R_yP_{1-z}C_zO_{4-n}D_n$; wherein A includes one or more elements selected from Zn, Al, Na, K, Mg, Nb, Mo and W; R includes one or more elements selected from Ti, V, Zr, Fe, Ni, Mg, Co, Ga, Sn, Sb, Nb and Ge; C includes one or more elements selected from B, S, Si and N; D includes one or more elements selected from S, F, Cl and Br; a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1; and the second positive electrode active material is selected from one or more of $LiNi_bCo_cMn_{(1-b)}O_2$, $LiNi_bCo_cAl_{(1-b-c)}O_2$ and $LiCoO_2$; wherein b is independently selected from 0.3-0.9 (optionally 0.33-0.8, e.g., 0.5), and the sum of b and c is independently selected from 0.3-0.9 (optionally 0.66-0.9, e.g., 0.7).

It should be noted that: when the positive electrode sheet includes two positive electrode film layers, "the positive electrode film layer is of a single-layer structure or a multi-layer structure" means that the two positive electrode film layers are each independently of a single-layer structure or a multi-layer structure; "when the positive electrode film layer is of a single-layer structure" refers to when one or two positive electrode film layers are of a single-layer structure; and "when the positive electrode film layer is of a multi-layer structure" refers to when one or two positive electrode film layers are of a multi-layer structure.

The first positive electrode active material of the present application is obtained by element doping in the compound $LiMnPO_4$, wherein A, B, C and D are elements doped at the Li site, the Mn site, the P site and the O site of the compound $LiMnPO_4$ respectively. Without wishing to be bound by theory, the inventor of the present application found that the performance improvement of lithium manganese phosphate is related to reducing the lattice change rate of lithium manganese phosphate and reducing surface activity during lithium intercalation and deintercalation. Reducing the lattice change rate can reduce the lattice constant difference between two phases at the grain boundary, reduce the interfacial stress, and enhance the transport capability of $Li^+$ at the interface, thereby improving the rate performance of the positive electrode active material. However, high surface activity can easily lead to serious interface side reactions, aggravate gas production, electrolyte solution consumption and interface damage, thereby affecting the cycling performance and other performance of the secondary battery. In the present application, the lattice change rate is reduced by Li and Mn site doping. Mn-site doping can also effectively reduce surface activity, thereby inhibiting the dissolution of Mn and the interface side reactions between the positive electrode active material and the electrolyte solution. P-site doping makes the change rate of the Mn—O bond length faster, lowers the small polaron migration potential barrier of the material, and thus is beneficial to the electronic conductivity. O-site doping has a good effect on reducing the interface side reactions. Doping at the P site and the O site also affects the dissolution of Mn and kinetic performance of antisite defects. Therefore, doping reduces the antisite defect concentration in the material, improves the kinetic performance and gram capacity of the material, and can also change the morphology of particles, thereby increasing the compacted density. The applicant unexpectedly found that: by simultaneously doping particular elements of particular amounts at the Li site, the Mn site, the P site and the O site of the compound $LiMnPO_4$, significantly improved rate performance can be obtained while significantly reducing dissolution of Mn and Mn-site doping elements, obtaining significantly improved cycling performance and/or high-temperature stability, and also improving the gram capacity and compacted density of the material; and in addition, in the present application, the first positive electrode active material and the second positive electrode active material are mixed to be used, the advantages of the two materials are complementary, which improves the energy density of the secondary battery, and at the same time, makes the secondary battery have excellent rate performance, kinetic performance, cycling performance, low-temperature performance and safety. Particles of the first positive electrode active material evenly coat the surface of the second positive electrode active material, so that the second positive electrode active material is relatively independent in lattice and stable in skeleton, and the second positive electrode active material is not prone to collapsing during the charging and discharging process of the secondary battery, which further improves the cycling performance of the secondary battery. Moreover, a coating layer formed by the first positive electrode active material provides elastic strain force for external force impact or shear, effectively solving the safety problem of the second positive electrode active material.

In some embodiments of the first aspect, a positive electrode film layer III and a positive electrode film layer IV are arranged on two surfaces of the positive electrode current collector respectively, the positive electrode film layer III is of a multi-layer structure, the positive electrode film layer IV is of a single-layer structure, and at least one layer of the positive electrode film layer III comprises both a first positive electrode active material and a second positive electrode active material; optionally, the positive electrode film layer IV comprises one or both of the first positive electrode active material and the second positive electrode active material; and optionally, remaining layers of the positive electrode film layer III comprise the first positive electrode active material or the second positive electrode active material.

In some embodiments of the first aspect, a positive electrode film layer III and a positive electrode film layer IV are arranged on two surfaces of the positive electrode current collector respectively, the positive electrode film layer III is of a multi-layer structure, the positive electrode film layer IV is of a single-layer structure, and the positive electrode film layer IV comprises both a first positive electrode active material and a second positive electrode active material; and optionally, any layer of the positive electrode film layer III comprises the first positive electrode active material or the second positive electrode active material.

In some embodiments of the first aspect, two surfaces of the positive electrode current collector are each provided with one positive electrode film layer, each positive electrode film layer is of a multi-layer structure, and at least one layer of each positive electrode film layer comprises both a first positive electrode active material and a second positive electrode active material; and optionally, remaining layers of the positive electrode film layer comprise the first positive electrode active material or the second positive electrode active material.

Embodiments of a second aspect of the present application provide a positive electrode sheet, including a positive electrode current collector and a positive electrode film layer arranged on at least one surface of the positive electrode current collector; at least one positive electrode film layer is of a multi-layer structure, and any positive electrode film layer having the multi-layer structure comprises a first positive electrode active material and a second positive electrode active material with a chemical formula of $Li_aA_xMn_{1-y}R_yP_{1-z}C_zO_{4-n}D_n$ in different layers respectively; wherein A includes one or more elements selected from Zn, Al, Na, K, Mg, Nb, Mo and W; R includes one or more elements selected from Ti, V, Zr, Fe, Ni, Mg, Co, Ga, Sn, Sb, Nb and Ge; C includes one or more elements selected from B, S, Si and N; D includes one or more elements selected from S, F, Cl and Br; a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1; the second positive electrode active material is selected from one or more of $LiNi_bCo_cMn_{(1-b-c)}O_2$, $LiNi_bCo_cAl_{(1-b-c)}O_2$ and $LiCoO_2$; wherein b is independently selected from 0.3-0.9 (optionally 0.33-0.8, e.g., 0.5), and the sum of b and c is independently selected from 0.3-0.9 (optionally 0.66-

0.9, e.g., 0.7); and optionally, any positive electrode film layer having the multi-layer structure comprises the first positive electrode active material and the second positive electrode active material in adjacent layers respectively.

In some embodiments of the second aspect, two surfaces of the positive electrode current collector are each provided with one positive electrode film layer, each positive electrode film layer is of a multi-layer structure, and two adjacent layers of each positive electrode film layer comprise a first positive electrode active material and a second positive electrode active material respectively.

In some embodiments of the second aspect, a positive electrode film layer V and a positive electrode film layer VI are arranged on two surfaces of the positive electrode current collector respectively, the positive electrode film layer V is of a multi-layer structure, the positive electrode film layer VI is of a single-layer structure, and two adjacent layers of the positive electrode film layer V comprise a first positive electrode active material and a second positive electrode active material respectively; and optionally, remaining layers of the positive electrode film layer V and the positive electrode film layer VI comprise the first positive electrode active material or the second positive electrode active material.

Embodiments of a third aspect of the present application provide a positive electrode sheet, including a positive electrode current collector and a positive electrode film layer I and a positive electrode film layer II arranged on two surfaces of the positive electrode current collector respectively; the positive electrode film layer I and the positive electrode film layer II are each of a single-layer structure or multi-layer structure independently; at least one layer of the positive electrode film layer I comprises a first positive electrode active material with a chemical formula of $Li_aA_xMn_{1-y}R_yP_{1-z}C_zO_{4-n}D_n$, and at the same time, at least one layer of the positive electrode film layer II comprises a second positive electrode active material; wherein A includes one or more elements selected from Zn, Al, Na, K, Mg, Nb, Mo and W; R includes one or more elements selected from Ti, V, Zr, Fe, Ni, Mg, Co, Ga, Sn, Sb, Nb and Ge; C includes one or more elements selected from B, S, Si and N; D includes one or more elements selected from S, F, Cl and Br; a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1; and the second positive electrode active material is selected from one or more of $LiNi_bCo_cMn_{(1-b-c)}O_2$, $LiNi_bCo_cAl_{(1-b-c)}O_2$ and $LiCoO_2$; wherein b is independently selected from 0.3-0.9 (optionally 0.33-0.8, e.g., 0.5), and the sum of b and c is independently selected from 0.3-0.9 (optionally 0.66-0.9, e.g., 0.7).

In the embodiments of the second aspect or the third aspect of the present application, the first positive electrode active material has significantly improved rate performance, while significantly reducing the dissolution of Mn and Mn-site doping elements, obtaining significantly improved cycling performance and/or high-temperature stability, also improving the gram capacity and compacted density of the material, and reducing interface side reactions. Specific principles are the same as those in the first embodiment of the present application. Although mechanisms are not quite clear, in this application, the first positive electrode active material and the second positive electrode active material are used in combination, and the advantages of the two materials are complementary, which improves the energy density of the secondary battery, and at the same time, makes the secondary battery have excellent rate performance, kinetic performance, cycling performance, low-temperature performance and safety. Specifically, it may be because the first positive electrode active material provides elastic strain force for external force impact or shear, which effectively solves the safety problem of the second positive electrode active material.

Unless otherwise specified, in the chemical formula $Li_aA_xMn_{1-y}R_yP_{1-z}C_zO_{4-n}D_n$, when A is two or more elements, the definition for the value range of x is not only a definition for the stoichiometric number of each element as A, but also a definition for the sum of the stoichiometric numbers of various elements as A. For example, when A is two or more elements A1, A2 . . . An, the respective stoichiometric numbers x1, x2 . . . xn for A1, A2 . . . An each are required to fall within the numerical range defined for x in the present application, and the sum of x1, x2 . . . xn are also required to fall within this numerical range. Similarly, in the case where R, C and D are each two or more elements, the definition for the numerical ranges of the stoichiometric numbers of R, C and D in the present application also has the above-mentioned meaning.

In some embodiments of the first aspect to the third aspect, the first positive electrode active material $Li_aA_xMn_{1-y}R_yP_{1-z}C_zO_{4-n}D_n$ maintains electrical neutrality throughout.

In some embodiments of the first aspect to the third aspect, a mass ratio of the first active material to the second active material is 1:7 to 7:1, optionally 1:4 to 4:1. Thus it is ensured that the secondary battery has excellent rate performance, excellent cycling performance and high-temperature stability, high energy density, excellent kinetic performance and low-temperature performance, the interface side reactions are reduced, and the safety of the secondary battery is improved.

In some embodiments of the first aspect to the third aspect, in the first positive electrode active material, R is selected from at least two of Ti, V, Zr, Fe, Ni, Mg, Co, Ga, Sn, Sb, Nb and Ge. Thus, the composition of the first positive electrode active material can be controlled more easily and accurately.

In some embodiments of the first aspect to the third aspect, in the first positive electrode active material, A is any element selected from Mg and Nb; and/or, R is selected from at least two of Fe, Ti, V, Co and Mg, optionally Fe and one or more elements selected from Ti, V, Co and Mg; and/or, C is S; and/or, D is F. By selecting the Li-site doping elements within the above range, the lattice change rate during the delithiation process can be further reduced, thereby further improving the rate performance of the secondary battery. By selecting the Mn-site doping elements within the above range, the electronic conductivity can be further improved and the lattice change rate can be further reduced, thereby improving the rate performance and gram capacity of the secondary battery. By selecting the P-site doping elements within the above range, the rate performance of the secondary battery can be further improved. By selecting the O-site doping elements within the above range, the interface side reactions can be further reduced, and the high-temperature performance of the secondary battery can be improved.

In some embodiments of the first aspect to the third aspect, in the first positive electrode active material, x is selected from a range of 0.001-0.005. By selecting the value of x within this range, the kinetic performance of the first positive electrode active material can be further improved.

In some embodiments of the first aspect to the third aspect, in the first positive electrode active material, y is selected from a range of 0.01 to 0.5, optionally selected from a range of 0.25 to 0.5. By selecting the value of y within this range, the gram capacity and rate performance of the first positive electrode active material can be further improved.

In some embodiments of the first aspect to the third aspect, in the first positive electrode active material, z is selected from a range of 0.001 to 0.005. By selecting the value of z within this range, the rate performance of the secondary battery can be further improved.

In some embodiments of the first aspect to the third aspect, in the first positive electrode active material, n is selected from a range of 0.001 to 0.005. By selecting the value of n within this range, the high-temperature performance of the secondary battery can be further improved.

In some embodiments of the first aspect to the third aspect, in the first positive electrode active material, a ratio of (1-y) to y is selected from 1-4, optionally selected from 1.5-3, and a ratio of a to x is selected from 9-1100, optionally selected from 190-998. When this condition is satisfied, the energy density and cycling performance of the secondary battery can be further improved.

In some embodiments of the first aspect to the third aspect, a lattice change rate of the first positive electrode active material is below 8%, optionally below 4%. By reducing the lattice change rate, Li ion transport can be made easier, that is, Li ions have stronger migration ability in the material, which is beneficial to improving the rate performance of the secondary battery. The lattice change rate can be measured by methods known in the art, such as X-ray diffraction spectroscopy (XRD).

In some embodiments of the first aspect to the third aspect, a Li/Mn antisite defect concentration of the first positive electrode active material is below 2%, optionally below 0.5%. The so-called Li/Mn antisite defect refers to the exchange of the positions of $Li^+$ and $Mn^{2+}$ in the lattice of $LiMnPO_4$. The Li/Mn antisite defect concentration refers to the percentage of $Li^+$ that exchanges with $Mn^{2+}$ relative to the total amount of $Li^+$ in the positive electrode active material. By reducing the Li/Mn antisite defect concentration, it is beneficial to improving the gram capacity and rate performance of the first positive electrode active material. The Li/Mn antisite defect concentration can be measured by methods known in the art, such as XRD.

In some embodiments of the first aspect to the third aspect, a surface oxygen valence of the first positive electrode active material is below −1.82, optionally being −1.89 to −1.98. By lowering the surface oxygen valence, the interface side reactions between the first positive electrode active material and an electrolyte solution can be reduced, thereby improving the cycling performance and high-temperature stability of the secondary battery. The surface oxygen valence can be measured by methods known in the art, such as by electron energy loss spectroscopy (EELS).

In some embodiments of the first aspect to the third aspect, the compacted density of the first positive electrode active material at 3 T is 2.0 $g/cm^3$ or more, optionally 2.2 $g/cm^3$ or more. The higher the compacted density is, the greater the weight of the first positive electrode active material per unit volume will be. Therefore, increasing the compacted density is beneficial to the improvement of the volumetric energy density of a battery cell. The compacted density can be measured according to GB/T 24533-2009.

In some embodiments of the first aspect to the third aspect, the surface of the first positive electrode active material is further coated with carbon. Thereby, the conductivity of the first positive electrode active material can be improved.

In some embodiments of the first aspect to the third aspect, a ratio of b to (1-b-c) to c in $LiNi_bCo_cMn_{(1-b-c)}O_2$ is 5:2:3 or 3:1:1 or 8:1:1; and/or, a ratio of b to c to (1-b-c) in $LiNi_bCo_cMn_{(1-b-c)}O_2$ is 5:2:3 or 3:1:1 or 8:1:1. Thus, the energy density of the secondary battery can be further improved.

In some embodiments of the first aspect to the third aspect, the sum of the mass of the first positive electrode active material and the second positive electrode active material accounts for 88%-98.7% of the mass of the positive electrode sheet. Further ensure that the secondary battery has excellent rate performance, kinetic performance, cycling performance and low-temperature performance, and has high energy density.

In some embodiments of the first aspect to the third aspect, the positive electrode current collector has two opposite surfaces in its own thickness direction, and the positive electrode film layer is arranged on either or both of the opposite surfaces of the positive electrode current collector.

In some embodiments of the first aspect to the third aspect, the positive electrode current collector can be a metal foil or a composite current collector. For example, an aluminium foil can be used as the metal foil. The composite current collector may include a high molecular material substrate layer and a metal layer formed on at least one surface of the high molecular material substrate layer. The composite current collector can be formed by forming a metal material (aluminium, aluminium alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments of the first aspect to the third aspect, the positive electrode film layer may further comprise other positive electrode active materials for secondary batteries known in the art. As an example, the positive electrode active material may include at least one of the following materials: lithium-containing phosphate with an olivine structure, a lithium transition metal oxide, and their respective modified compounds. However, the present application is not limited to these materials, and other conventional materials useful as positive electrode active materials for secondary batteries can also be used. It is possible to use only one of these positive electrode active materials alone, or to use more than two in combination. Examples of the lithium transition metal oxide may include, but are not limited to, at least one of a lithium nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manganese oxide, and their modified compounds. Examples of the lithium-containing phosphate with the olivine structure may include, but are not limited to, at least one of lithium iron phosphate (such as $LiFePO_4$ (also abbreviated as LFP)), a lithium iron phosphate-carbon composite, lithium manganese phosphate (such as $LiMnPO_4$), a lithium manganese phosphate-carbon composite, lithium manganese iron phosphate, and a lithium manganese iron phosphate-carbon composite.

In some embodiments of the first aspect to the third aspect, the positive electrode film layer further optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments of the first aspect to the third aspect, the positive electrode film layer further optionally includes a conductive agent. As an example, the conductive agent may include at least one of superconducting carbon, acetylene black, carbon black, Ketjen black, carbon dots, carbon nanotubes, graphene, and carbon nanofibers.

[Negative Electrode Sheet]

A negative electrode sheet includes a negative electrode current collector and a negative electrode film layer arranged on at least one surface of the negative electrode current collector, wherein the negative electrode film layer includes a negative electrode active material.

As an example, the negative electrode current collector has two opposite surfaces in its own thickness direction, and the negative electrode film layer is provided on either one or both of the two opposite surfaces of the negative electrode current collector.

In some embodiments, the negative electrode current collector can be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments, the negative electrode active material may be a negative electrode active material for secondary batteries well known in the art. As an example, the negative electrode active material may include at least one of the following materials: artificial graphite, natural graphite, soft carbon, hard carbon, a silicon-based material, a tin-based material, and lithium titanate, etc. The silicon-based material may be selected from at least one of monolithic silicon, silicon-oxygen compound, silicon-carbon composite, silicon-nitrogen composite, and silicon alloy. The tin-based material may be selected from at least one of monolithic tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally includes a binder. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer further optionally comprises a conductive agent. As an example, the conductive agent may be selected from at least one of superconducting carbon, acetylene black, carbon black, Ketjen black, carbon dot, carbon nanotube, graphene, and carbon nanofiber.

In some embodiments, the negative electrode film layer further optionally includes other auxiliaries, for example, a thickener (e. g., sodium carboxymethyl cellulose (CMC-Na)) and the like.

In some embodiments, the negative electrode sheet can be prepared by dispersing the components for preparing the negative electrode sheet, for example, the negative electrode active material, the conductive agent, the binder and any other components in a solvent (for example, deionized water) to form a negative electrode slurry; and coating a negative electrode current collector with the negative electrode slurry, followed by oven drying, cold pressing and other procedures, to obtain the negative electrode sheet.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid state, a gel state, or an all-solid state.

In some embodiments, the electrolyte is in a liquid state, and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalate)borate, lithium difluoro bis(oxalato)phosphate, and lithium tetrafluoro(oxalato) phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution further optionally comprises an additive. As an example, the additive may include a negative electrode film-forming additive, a positive electrode film-forming additive, and also an additive capable of improving certain properties of the battery, such as an additive for improving the overcharge performance of the battery, and an additive for improving the high-temperature or low-temperature performance of the battery, etc.

[Separator]

In some embodiments, the secondary battery also includes a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, which is not particularly limited.

In some embodiments, the positive electrode sheet, the negative electrode sheet, and the separator can be made into an electrode assembly by a winding process or a lamination process.

In some embodiments, the secondary battery may include an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

The present application has no particular limitation on the shape of the secondary battery, which can be cylindrical, square or any other shape. For example, FIG. 1 shows a secondary battery 5 with a square structure as an example.

Figure 2:
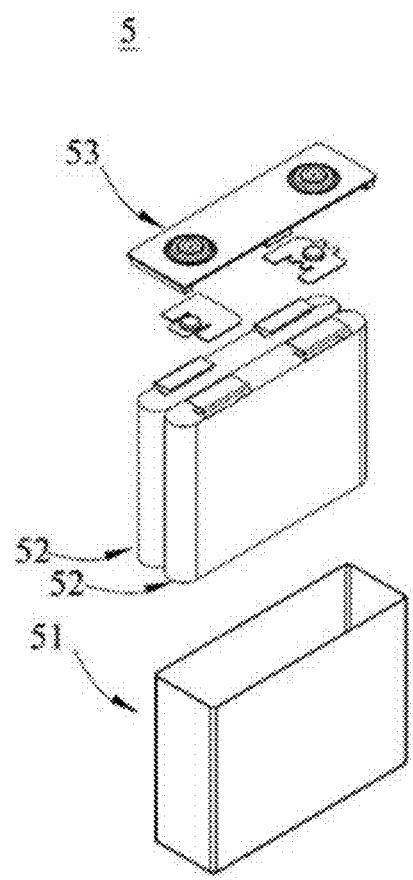
FIG. 2 is an exploded view of the secondary battery according to an embodiment of the present application shown in FIG. 1.

In some embodiments, referring to FIG. 2, the outer package may comprise a case 51 and a cover plate 53. Here, the case 51 can include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode sheet, the negative electrode sheet, and the separator may be formed into an electrode assembly 52 by a winding process or a lamination process. The electrode assembly 52 is encapsulated within the accommodating cavity. The electrolyte solution impregnates the electrode assembly 52. The number of electrode assemblies 52 included in the secondary battery 5 may be one or more, which can be selected by those skilled in the art according to specific actual requirements.

In some embodiments, the secondary batteries may be assembled into a battery module, the number of the secondary batteries included in the battery module may be one or more, and the specific number may be selected by those skilled in the art according to the application and capacity of the battery module.

Figure 3:
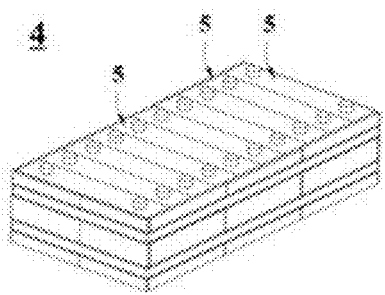
FIG. 3 is a schematic view of a battery module according to an embodiment of the present application.

FIG. 3 shows a battery module 4 as an example. Referring to FIG. 3, in the battery module 4, a plurality of secondary batteries 5 can be sequentially arranged along the length direction of the battery module 4. Of course, any other arrangements are also possible. The plurality of secondary batteries 5 may further be fixed by fasteners.

Optionally, the battery module 4 can further include a shell having an accommodating space, in which the plurality of secondary batteries 5 are accommodated.

In some embodiments, the battery modules may further be assembled into a battery pack, the number of the battery modules contained in the battery pack may be one or more, and the specific number can be selected by those skilled in the art according to the use and capacity of the battery pack.

Figure 4:
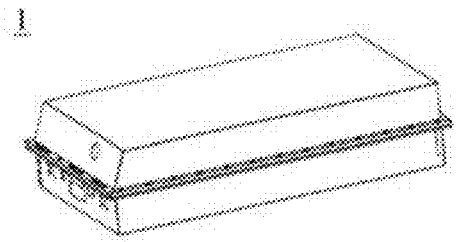
FIG. 4 is a schematic view of a battery pack according to an embodiment of the present application.
Figure 5:
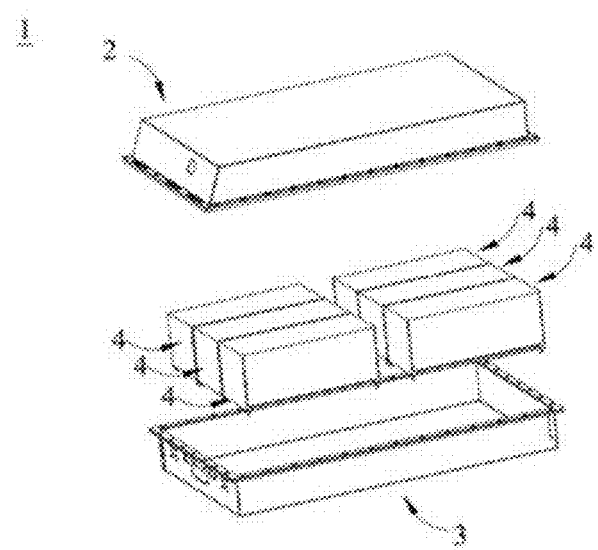
FIG. 5 is an exploded view of the battery pack according to an embodiment of the present application shown in FIG. 4.

FIGS. 4 and 5 show a battery pack 1 as an example. Referring to FIGS. 4 and 5, the battery pack 1 may include a battery box and a plurality of battery modules 4 provided in the battery box. The battery box includes an upper box body 2 and a lower box body 3, and the upper box body 2 can cover the lower box body 3 to form a closed space for accommodating the battery modules 4. The plurality of battery modules 4 may be arranged in the battery box in any manner.

In addition, the present application further provides an electrical apparatus comprising at least one of the secondary battery, the battery module, or the battery pack provided in the present application. The secondary battery, the battery module, or the battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electrical apparatus, the secondary battery, the battery module, or the battery pack can be selected according to its use requirements.

Figure 6:
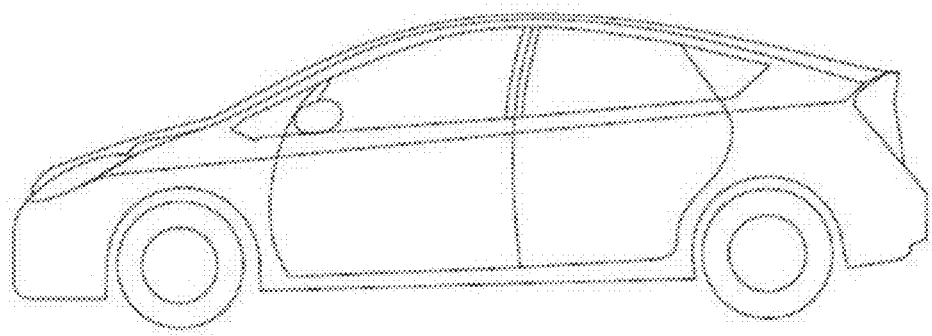
FIG. 6 is a schematic view of an electrical apparatus in which a secondary battery is used as a power source according to an embodiment of the present application.
Figure 7:
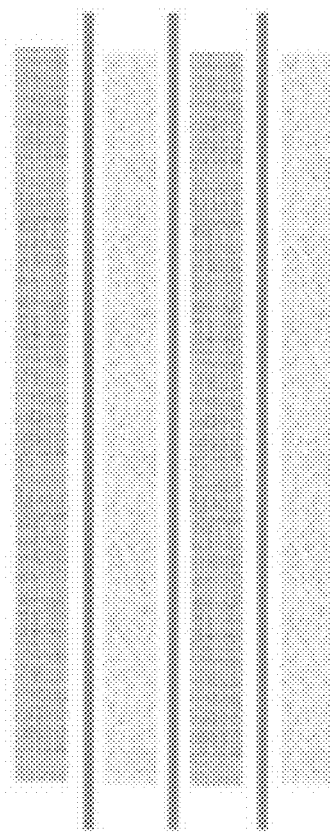
FIG. 7 is a schematic view of a battery structure manufactured from a positive electrode sheet P1 according to the present application.
Figure 8:
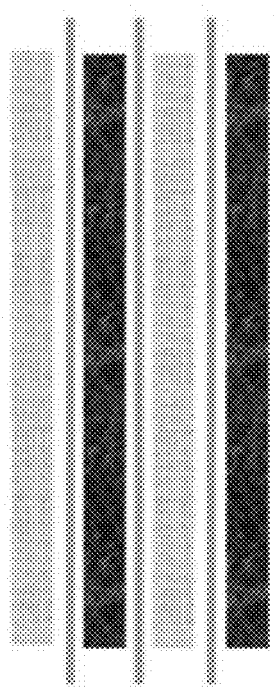
FIG. 8 is a schematic view of a battery structure manufactured from a positive electrode sheet P2 according to the present application.
Figure 9:
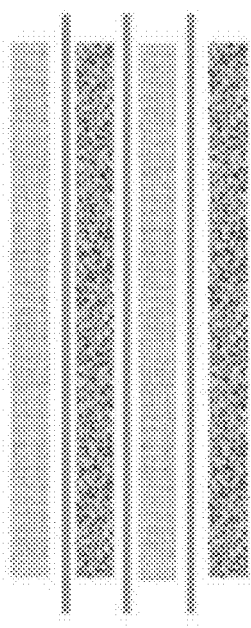
FIG. 9 is a schematic view of a battery structure manufactured from a positive electrode sheet P3 according to the present application.
Figure 10:
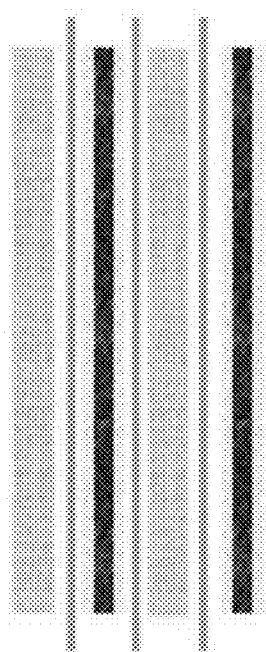
FIG. 10 is a schematic view of a battery structure manufactured from a positive electrode sheet P8 according to the present application.
Figure 11:
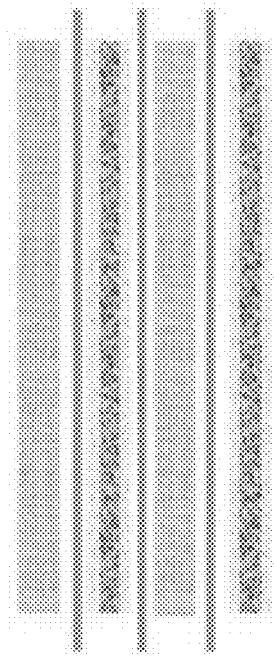
FIG. 11 is a schematic view of a battery structure manufactured from a positive electrode sheet P10 according to the present application.
Figure 12:
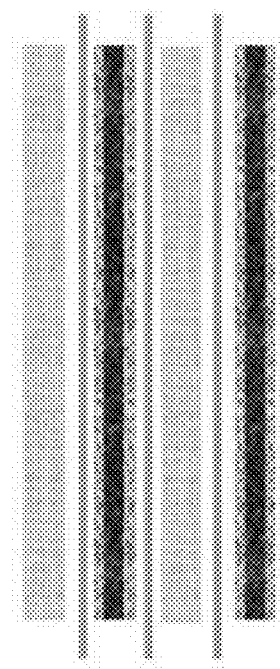
FIG. 12 is a schematic view of a battery structure manufactured from a positive electrode sheet P11 according to the present application.
Figure 13:
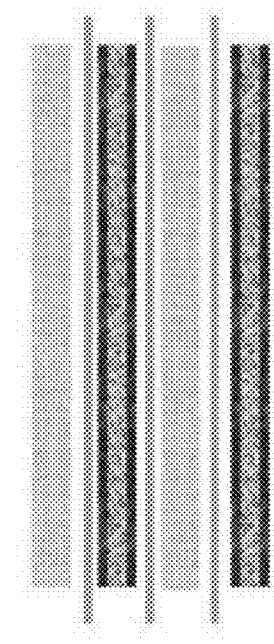
FIG. 13 is a schematic view of a battery structure manufactured from a positive electrode sheet P12 according to the present application.
Figure 14:
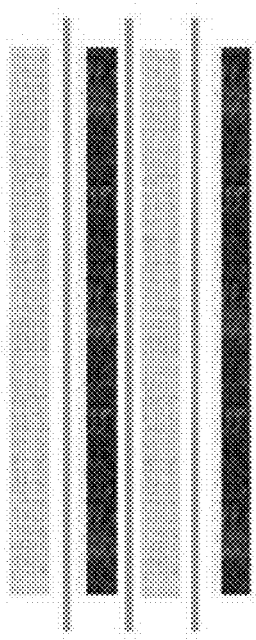
FIG. 14 is a schematic view of a battery structure manufactured from a positive electrode sheet P17 according to the present application.
Figure 15:
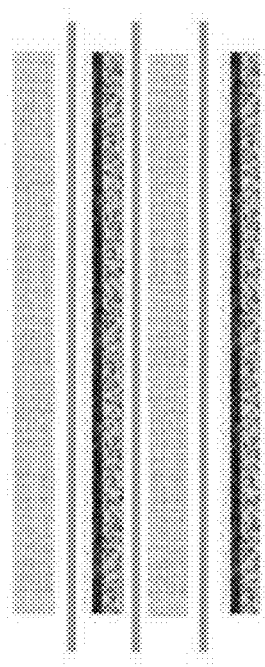
FIG. 15 is a schematic view of a battery structure manufactured from a positive electrode sheet P18 according to the present application.
Figure 16:
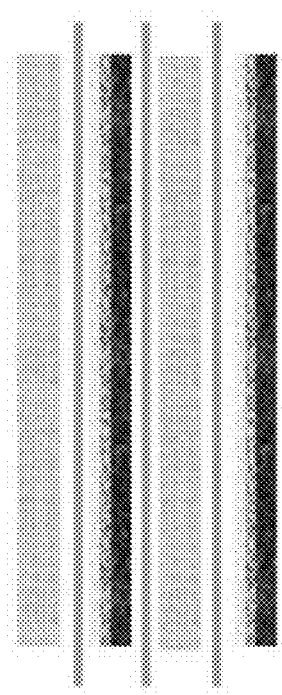
FIG. 16 is a schematic view of a battery structure manufactured from a positive electrode sheet P23 according to the present application.
Figure 17:
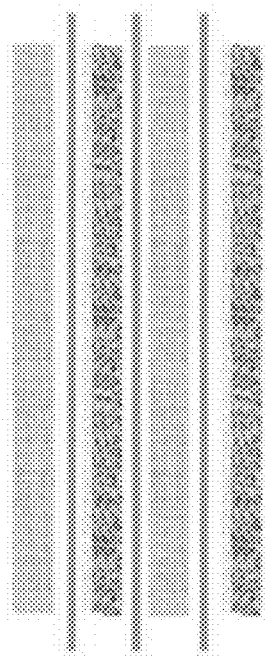
FIG. 17 is a schematic view of a battery structure manufactured from a positive electrode sheet P24 according to the present application.
Figure 18:
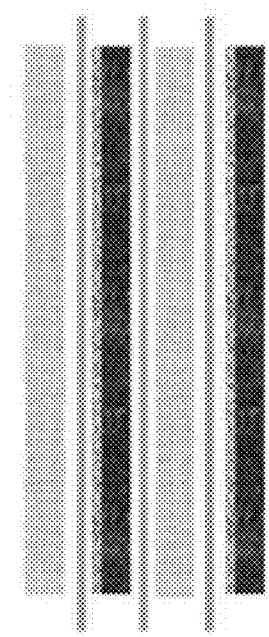
FIG. 18 is a schematic view of a battery structure manufactured from a positive electrode sheet P26 according to the present application.
Figure 19:
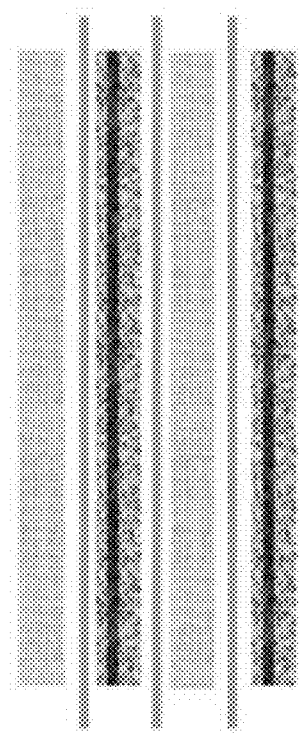
FIG. 19 is a schematic view of a battery structure manufactured from a positive electrode sheet P27 according to the present application.

FIG. 6 is an example of an electrical apparatus. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

EXAMPLES

Examples of the present application will be described hereinafter. The examples described below are exemplary and only used to explain the present application, and are not to be construed as limiting the present application. Where specific techniques or conditions are not specified in the examples, the techniques or conditions described in the literatures of the art or the product specifications are followed. All of the used agents or instruments which are not specified with the manufacturer are conventional commercially-available products.

Preparation of Positive Electrode Active Material and Slurry Thereof

Preparation Example 1

Preparation of doped manganese oxalate: 1.3 mol of $MnSO_4 \cdot H_2O$ and 0.7 mol of $FeSO_4 \cdot H_2O$ were fully mixed in a mixer for 6 hours; a mixture was transferred into a reaction kettle, 10 L of deionized water and 2 mol of oxalic acid dihydrate were added, heating was carried out to 80° C., then stirring was carried out at 600 rpm for 6 hours, a reaction was terminated (no bubbles were generated), and a suspension of Fe-doped manganese oxalate was obtained; and the suspension was filtered, a filter cake was dried at 120° C., and grinding was carried out to obtain Fe-doped manganese oxalate particles with a particle size $Dv_{50}$ of about 100 nm;

Preparation of doped lithium manganese phosphate: 1 mol of Fe-doped manganese oxalate particles, 0.497 mol of lithium carbonate, 0.001 mol of $Mo(SO_4)_3$, a 85% phosphoric acid aqueous solution containing 0.999 mol of phosphoric acid, 0.001 mol of $H_4SiO_4$, 0.0005 mol of $NH_4HF_2$ and 0.005 mol of sucrose were added to 20 L of deionized water, and a mixture was transferred into a sand mill to be fully ground and stirred for 10 hours to obtain a slurry; the slurry was transferred into a spray drying device for spray-drying granulation, with a drying temperature set to 250° C., and drying was carried out for 4 hours to obtain particles; and in a protective atmosphere of nitrogen (90% v/v)+hydrogen (10% v/v), the particles were sintered at 700° C. for 10 hours to obtain a positive electrode active material 1, namely carbon-coating $Li_{0.994}Mo_{0.001}Mn_{0.65}Fe_{0.35}P_{0.999}Si_{0.001}O_{3.999}F_{0.001}$. Element content detection for the positive electrode active material can be performed by inductively coupled plasma emission spectrometry (ICP).

Preparation Example 2

In addition to changing the amount of high-purity $Li_2CO_3$ to 0.4885 mol, replacing $Mo(SO_4)_3$ with equimolar $MgSO_4$, changing the amount of $FeSO_4 \cdot H_2O$ to 0.68 mol, further adding 0.02 mol of $Ti(SO_4)_2$ when preparing the doped manganese oxalate, and replacing $H_4SiO_4$ with equimolar $HNO_3$, the others were the same as those in preparation example 1.

Preparation Example 3

In addition to changing the amount of high-purity $Li_2CO_3$ to 0.496 mol, replacing $Mo(SO_4)_3$ with equimolar $W(SO_4)_3$, and replacing $H_4SiO_4$ with equimolar $H_2SO_4$, the others were the same as those in preparation example 1.

Preparation Example 4

In addition to changing the amount of high-purity $Li_2CO_3$ to 0.4985 mol, replacing 0.001 mol of $Mo(SO_4)_3$ with 0.0005 mol of $Al_2(SO_4)_3$ and replacing $NH_4HF_2$ with equimolar $NH_4HCl_2$, the others were the same as those in preparation example 1.

Preparation Example 5

In addition to changing 0.7 mol of $FeSO_4 \cdot H_2O$ to 0.69 mol, further adding 0.01 mol of $VCl_2$ when preparing the doped manganese oxalate, changing the amount of $Li_2CO_3$ to 0.4965 mol, replacing 0.001 mol of $Mo(SO_4)_3$ with 0.0005 mol of $Nb_2(SO_4)_5$ and replacing $H_4SiO_4$ with equimolar $H_2SO_4$, the others were the same as those in preparation example 1.

Preparation Example 6

In addition to changing the amount of $FeSO_4 \cdot H_2O$ to 0.68 mol, further adding 0.01 mol of $VCl_2$ and 0.01 mol of $MgSO_4$ when preparing the doped manganese oxalate, changing the amount of $Li_2CO_3$ to 0.4965 mol, replacing 0.001 mol of $Mo(SO_4)_3$ with 0.0005 mol of $Nb_2(SO_4)_5$ and replacing $H_4SiO_4$ with equimolar $H_2SO_4$, the others were the same as those in preparation example 1.

Preparation Example 7

In addition to replacing $MgSO_4$ with equimolar $CoSO_4$, the others were the same as those in preparation example 6.

Preparation Example 8

In addition to replacing $MgSO_4$ with equimolar $NiSO_4$, the others were the same as those in preparation example 6.

Preparation Example 9

In addition to changing the amount of $FeSO_4 \cdot H_2O$ to 0.698 mol, further adding 0.002 mol of $Ti(SO_4)_2$ when preparing the doped manganese oxalate, changing the amount of $Li_2CO_3$ to 0.4955 mol, replacing 0.001 mol of $Mo(SO_4)_3$ with 0.0005 mol of $Nb_2(SO_4)_5$, replacing $H_4SiO_4$ with equimolar $H_2SO_4$ and replacing $NH_4HF_2$ with equimolar $NH_4HCl_2$, the others were the same as those in preparation example 1.

Preparation Example 10

In addition to changing the amount of $FeSO_4 \cdot H_2O$ to 0.68 mol, further adding 0.01 mol of $VCl_2$ and 0.01 mol of $MgSO_4$ when preparing the doped manganese oxalate, changing the amount of $Li_2CO_3$ to 0.4975 mol, replacing 0.001 mol of $Mo(SO_4)_3$ with 0.0005 mol of $Nb_2(SO_4)_5$ and replacing $NH_4HF_2$ with equimolar $NH_4HBr_2$, the others were the same as those in preparation example 1.

Preparation Example 11

In addition to changing the amount of $FeSO_4 \cdot H_2O$ to 0.69 mol, further adding 0.01 mol of $VCl_2$ when preparing the doped manganese oxalate, changing the amount of $Li_2CO_3$ to 0.499 mol, replacing $Mo(SO_4)_3$ with equimolar $MgSO_4$ and replacing $NH_4HF_2$ with equimolar $NH_4HBr_2$, the others were the same as those in preparation example 1.

Preparation Example 12

In addition to changing the amount of $MnSO_4 \cdot H_2O$ to 1.36 mol, changing the amount of $FeSO_4 \cdot H_2O$ to 0.6 mol, further adding 0.04 mol of $VCl_2$ when preparing the doped manganese oxalate, changing the amount of $Li_2CO_3$ to 0.4985 mol, replacing $Mo(SO_4)_3$ with equimolar $MgSO_4$ and replacing $H_4SiO_4$ with equimolar $HNO_3$, the others were the same as those in preparation example 1.

Preparation Example 13

In addition to changing the amount of $MnSO_4 \cdot H_2O$ to 1.16 mol, and changing the amount of $FeSO_4 \cdot H_2O$ to 0.8 mol, the others were the same as those in preparation example 12.

Preparation Example 14

In addition to changing the amount of $MnSO_4 \cdot H_2O$ to 1.3 mol and changing the amount of $VCl_2$ to 0.1 mol, the others were the same as those in preparation example 12.

Preparation Example 15

In addition to changing the amount of $MnSO_4 \cdot H_2O$ to 1.2 mol, further adding 0.1 mol of $VCl_2$ when preparing the doped manganese oxalate, changing the amount of $Li_2CO_3$ to 0.494 mol, replacing 0.001 mol of $Mo(SO_4)_3$ with 0.005 mol of $MgSO_4$ and replacing $H_4SiO_4$ with equimolar $H_2SO_4$, the others were the same as those in preparation example 1.

Preparation Example 16

In addition to changing the amount of $MnSO_4 \cdot H_2O$ changed to 1.2 mol, further adding 0.1 mol of $VCl_2$ when preparing the doped manganese oxalate, changing the amount of $Li_2CO_3$ to 0.467 mol, replacing 0.001 mol of $Mo(SO_4)_3$ with 0.005 mol of $MgSO_4$, replacing 0.001 mol of $H_4SiO_4$ with 0.005 mol of $H_2SO_4$ and replacing 1.175 mol of 85% phosphoric acid with 1.171 mol of 85% phosphoric acid, the others were the same as those in preparation example 1.

Preparation Example 17

In addition to changing the amount of $MnSO_4 \cdot H_2O$ to 1.2 mol, further adding 0.1 mol of $VCl_2$ when preparing the doped manganese oxalate, changing the amount of $Li_2CO_3$ to 0.492 mol, replacing 0.001 mol of $Mo(SO_4)_3$ with 0.005 mol of $MgSO_4$, replacing $H_4SiO_4$ with equimolar $H_2SO_4$, and changing 0.0005 mol of NH$_4$HF$_2$ to 0.0025 mol, the others were the same as those in preparation example 1.

Preparation Example 18

In addition to changing the amount of FeSO$_4$·H$_2$O to 0.5 mol, further adding 0.1 mol of VCl$_2$ and 0.1 mol of CoSO$_4$ when preparing the doped manganese oxalate, changing the amount of Li$_2$CO$_3$ to 0.492 mol, replacing 0.001 mol of Mo(SO$_4$)$_3$ with 0.005 mol of MgSO$_4$, replacing H$_4$SiO$_4$ with equimolar H$_2$SO$_4$, and changing 0.0005 mol of NH$_4$HF$_2$ to 0.0025 mol, the others were the same as those in preparation example 1.

Preparation Example 19

In addition to changing the amount of FeSO$_4$·H$_2$O to 0.4 mol, and changing 0.1 mol of CoSO$_4$ to 0.2 mol, the others were the same as those in preparation example 18.

Preparation Example 20

In addition to changing the amount of MnSO$_4$·H$_2$O to 1.5 mol, changing the amount of FeSO$_4$·H$_2$O to 0.1 mol and changing the amount of CoSO$_4$ to 0.3 mol, the others were the same as those in preparation example 18.

Preparation Example 21

In addition to replacing 0.1 mol of CoSO$_4$ with 0.1 mol of NiSO$_4$, the others were the same as those in preparation example 18.

Preparation Example 22

In addition to changing the amount of MnSO$_4$·H$_2$O to 1.5 mol, changing the amount of FeSO$_4$·H$_2$O to 0.2 mol, and replacing 0.1 mol of CoSO$_4$ with 0.2 mol of NiSO$_4$, the others were the same as those in preparation example 18.

Preparation Example 23

In addition to changing the amount of MnSO$_4$·H$_2$O to 1.4 mol, changing the amount of FeSO$_4$·H$_2$O to 0.3 mol and changing the amount of CoSO$_4$ to 0.2 mol, the others were the same as those in preparation example 18.

Preparation Example 24

In addition to changing 1.3 mol of MnSO$_4$·H$_2$O to 1.2 mol, changing 0.7 mol of FeSO$_4$·H$_2$O to 0.5 mol, further adding 0.1 mol of VCl$_2$ and 0.2 mol of CoSO$_4$ when preparing the doped manganese oxalate, changing the amount of Li$_2$CO$_3$ to 0.497 mol, replacing 0.001 mol of Mo(SO$_4$)$_3$ with 0.005 mol of MgSO$_4$, replacing H$_4$SiO$_4$ with equimolar H$_2$SO$_4$, and changing 0.0005 mol of NH$_4$HF$_2$ to 0.0025 mol, the others were the same as those in preparation example 1.

Preparation Example 25

In addition to changing the amount of MnSO$_4$·H$_2$O to 1.0 mol, changing the amount of FeSO$_4$·H$_2$O to 0.7 mol and changing the amount of CoSO$_4$ to 0.2 mol, the others were the same as those in preparation example 18.

Preparation Example 26

In addition to changing the amount of MnSO$_4$·H$_2$O to 1.4 mol, changing the amount of FeSO$_4$·H$_2$O to 0.3 mol, further adding 0.1 mol of VCl$_2$ and 0.2 mol of CoSO$_4$ when preparing the doped manganese oxalate, changing the amount of Li$_2$CO$_3$ to 0.4825 mol, replacing 0.001 mol of Mo(SO$_4$)$_3$ with 0.005 mol of MgSO$_4$, changing the amount of H$_4$SiO$_4$ to 0.1 mol, changing the amount of phosphoric acid to 0.9 mol and changing the amount of NH$_4$HF$_2$ to 0.04 mol, the others were the same as those in preparation example 1.

Preparation Example 27

In addition to changing the amount of MnSO$_4$·H$_2$O to 1.4 mol, changing the amount of FeSO$_4$·H$_2$O to 0.3 mol, further adding 0.1 mol of VCl$_2$ and 0.2 mol of CoSO$_4$ when preparing the doped manganese oxalate, changing the amount of Li$_2$CO$_3$ to 0.485 mol, replacing 0.001 mol of Mo(SO$_4$)$_3$ with 0.005 mol of MgSO$_4$, changing the amount of H$_4$SiO$_4$ to 0.08 mol, changing the amount of phosphoric acid to 0.92 mol and changing the amount of NH$_4$HF$_2$ to 0.05 mol, the others were the same as those in preparation example 1.

Preparation Examples 28-41

A positive electrode active material was prepared in the same manner as preparation example 1, but the stirring speed, temperature, grinding and stirring time in a sand mill, sintering temperature and sintering time when preparing doped manganese oxalate were changed, specifically as shown in Table 1 below.

TABLE 1

Stirring speed, temperature, grinding and stirring time in sand mill, sintering temperature and sintering time when preparing doped manganese oxalate in preparation examples 28-41

| | Stirring speed (rpm) | Stirring temperature (° C.) | Grinding time (h) | Sintering temperature (° C.) | Sintering time (h) |
| --- | --- | --- | --- | --- | --- |
| Preparation Example 28 | 200 | 50 | 12 | 700 | 10 |
| Preparation Example 29 | 300 | 50 | 12 | 700 | 10 |
| Preparation Example 30 | 400 | 50 | 12 | 700 | 10 |
| Preparation Example 31 | 500 | 50 | 12 | 700 | 10 |
| Preparation Example 32 | 600 | 50 | 10 | 700 | 10 |
| Preparation Example 33 | 700 | 50 | 11 | 700 | 10 |
| Preparation Example 34 | 800 | 50 | 12 | 700 | 10 |
| Preparation Example 35 | 600 | 60 | 12 | 700 | 10 |
| Preparation Example 36 | 600 | 70 | 12 | 700 | 10 |
| Preparation Example 37 | 600 | 80 | 12 | 700 | 10 |
| Preparation Example 38 | 600 | 90 | 12 | 600 | 10 |
| Preparation Example 39 | 600 | 100 | 12 | 800 | 10 |
| Preparation Example 40 | 600 | 110 | 12 | 700 | 8 |
| Preparation Example 41 | 600 | 120 | 12 | 700 | 12 |

Preparation Examples 42-54

A positive electrode active material was prepared in the same manner as preparation example 1, but a lithium source, a manganese source, a phosphorus source and sources of doping elements A, B, C and D were changed, specifically as shown in Table 2 below. The composition of the prepared positive electrode active material was the same as in example 1, that is, $Li_{0.994}Mo_{0.001}Mn_{0.65}Fe_{0.35}P_{0.999}Si_{0.001}O_{3.999}F_{0.001}$.

TABLE 2

Lithium source, manganese source, phosphorus source and sources of doping elements A, B, C and D in preparation examples 42-54

| | Lithium source | Manganese source | Phosphorus source | Source of A | Source of B | Source of C | Source of D |
|---|---|---|---|---|---|---|---|
| Preparation Example 42 | LiOH | $MnCO_3$ | $NH_4H_2PO_4$ | $Mo(NO_3)_6$ | FeO | $H_4SiO_4$ | $NH_4F$ |
| Preparation Example 43 | LiOH | MnO | $NH_4H_2PO_4$ | $Mo(NO_3)_6$ | FeO | $H_4SiO_4$ | $NH_4F$ |
| Preparation Example 44 | LiOH | $Mn_3O_4$ | $NH_4H_2PO_4$ | $Mo(NO_3)_6$ | FeO | $H_4SiO_4$ | $NH_4F$ |
| Preparation Example 45 | LiOH | $Mn(NO_3)_2$ | $NH_4H_2PO_4$ | $Mo(NO_3)_6$ | FeO | $H_4SiO_4$ | $NH_4F$ |
| Preparation Example 46 | LiOH | MnO | $NH_4H_2PO_4$ | $Mo(NO_3)_6$ | $FeCO_3$ | $H_4SiO_4$ | $NH_4F$ |
| Preparation Example 47 | LiOH | MnO | $NH_4H_2PO_4$ | $Mo(NO_3)_6$ | $Fe(NO_3)_2$ | $H_4SiO_4$ | $NH_4F$ |
| Preparation Example 48 | LiOH | MnO | $NH_4H_2PO_4$ | $Mo(NO_3)_6$ | $Fe_3O_4$ | $H_4SiO_4$ | $NH_4F$ |
| Preparation Example 49 | LiOH | MnO | $NH_4H_2PO_4$ | $Mo(NO_3)_6$ | $FeC_2O_4$ | $H_4SiO_4$ | $NH_4F$ |
| Preparation Example 50 | LiOH | MnO | $NH_4H_2PO_4$ | $Mo(NO_3)_6$ | Fe | $H_4SiO_4$ | $NH_4F$ |
| Preparation Example 51 | LiOH | MnO | $NH_4H_2PO_4$ | $Mo(PO_4)_2$ | FeO | $H_4SiO_4$ | $NH_4F$ |
| Preparation Example 52 | LiOH | MnO | $NH_4H_2PO_4$ | $Mo(C_2O_4)_3$ | FeO | $H_4SiO_4$ | $NH_4F$ |
| Preparation Example 53 | LiOH | MnO | $NH_4H_2PO_4$ | $MoO_3$ | FeO | $H_4SiO_4$ | $NH_4F$ |
| Preparation Example 54 | LiOH | MnO | $NH_4H_2PO_4$ | Mo | FeO | $H_4SiO_4$ | $NH_4F$ |

Preparation Example 55

Lithium nickel cobalt manganese oxide $LiNi_{0.5}Co_{0.2}Mn_{0.3}O_2$ was used as the positive electrode active material.

Preparation Example 56

The positive electrode active materials of preparation example 1 and preparation example 55 were mixed according to a mass ratio of 1:1 as the positive electrode active material.

Preparation Example 57

Lithium nickel cobalt manganese oxide $LiNi_{0.33}Co_{0.33}Mn_{0.34}O_2$ was used as the positive electrode active material.

Preparation Example 58

Lithium nickel cobalt manganese oxide $LiNi_{0.8}Co_{0.1}Mn_{0.1}O_2$ was used as the positive electrode active material.

Preparation Example 59

Lithium nickel cobalt aluminium oxide $LiNi_{0.33}Co_{0.33}Al_{0.34}O_2$ was used as the positive electrode active material.

Preparation Example 60

Lithium nickel cobalt aluminium oxide $LiNi_{0.5}Co_{0.2}Al_{0.3}O_2$ was used as the positive electrode active material.

Preparation Example 61

Lithium nickel cobalt aluminium oxide $LiNi_{0.8}Co_{0.1}Al_{0.1}O_2$ was used as the positive electrode active material.

Preparation Example 62

Lithium cobalt oxide $LiCoO_2$ was used as the positive electrode active material

Preparation Example 63

The positive electrode active materials of preparation example 1 and preparation example 57 were mixed according to a mass ratio of 1:1 as the positive electrode active material.

Preparation Example 64

The positive electrode active materials of preparation example 1 and preparation example 58 were mixed according to a mass ratio of 1:1 as the positive electrode active material.

Preparation Example 65

The positive electrode active materials of preparation example 1 and preparation example 59 were mixed according to a mass ratio of 1:1 as the positive electrode active material.

Preparation Example 66

The positive electrode active materials of preparation example 1 and preparation example 60 were mixed according to a mass ratio of 1:1 as the positive electrode active material.

Preparation Example 67

The positive electrode active materials of preparation example 1 and preparation example 61 were mixed according to a mass ratio of 1:1 as the positive electrode active material.

Preparation Example 68

The positive electrode active materials of preparation example 1 and preparation example 62 were mixed according to a mass ratio of 1:1 as the positive electrode active material.

Comparative Example 1

Preparation of manganese oxalate: 1 mol of $MnSO_4 \cdot H_2O$ was added into a reaction kettle, and 10 L of deionized water and 1 mol of oxalic acid dihydrate (calculated as oxalic acid) were added. The reaction kettle was heated to 80° C., stirring was carried out at 600 rpm for 6 hours, a reaction was terminated (no bubbles were generated), and a manganese oxalate suspension was obtained. Then the suspension was filtered, a filter cake was dried at 120° C., and then sanding was carried out to obtain manganese oxalate particles with a particle size $Dv_{50}$ of 50-200 nm.

Preparation of lithium manganese phosphate: 1 mol of the above-mentioned manganese oxalate particles, 0.5 mol of lithium carbonate, a 85% phosphoric acid aqueous solution containing 1 mol of phosphoric acid and 0.005 mol of sucrose were added into 20 L of deionized water. A mixture was transferred into a sand mill and fully ground and stirred for 10 hours to obtain a slurry. The slurry was transferred into a spray drying device for spray-drying granulation, with drying temperature set to 250° C., and drying was carried out for 4 hours to obtain particles. In a protective atmosphere of nitrogen (90 volume %)+hydrogen (10 volume %), above powder was sintered at 700° C. for 10 hours to obtain carbon-coating $LiMnPO_4$.

Comparative Example 2

In addition to, in comparative example 1, replacing 1 mol of $MnSO_4 \cdot H_2O$ with 0.85 mol of $MnSO_4 \cdot H_2O$ and 0.15 mol of $FeSO_4 \cdot H_2O$, and adding into a mixer to be fully mixed for 6 hours before adding into the reaction kettle, the others were the same as those in comparative example 1.

Comparative Example 3

In addition to changing the amount of $MnSO_4 \cdot H_2O$ to 1.9 mol, replacing 0.7 mol of $FeSO_4 \cdot H_2O$ with 0.1 mol of $ZnSO_4$, changing the amount of $Li_2CO_3$ to 0.495 mol, replacing 0.001 mol of $Mo(SO_4)_3$ with 0.005 mol of $MgSO_4$, changing the amount of phosphoric acid to 1 mol, not adding $H_4SiO_4$ or $NH_4HF_2$, the others were the same as those in preparation example 1.

Comparative Example 4

In addition to changing the amount of $MnSO_4 \cdot H_2O$ to 1.2 mol, changing the amount of $FeSO_4 \cdot H_2O$ to 0.8 mol, changing the amount of $Li_2CO_3$ to 0.45 mol, replacing 0.001 mol of $Mo(SO_4)_3$ with 0.005 mol of $Nb_2(SO_4)_5$, changing 0.999 mol of phosphoric acid to 1 mol, changing 0.0005 mol of $NH_4HF_2$ to 0.025 mol, and not adding $H_4SiO_4$, the others were the same as those in preparation example 1.

Comparative Example 5

In addition to changing the amount of $MnSO_4 \cdot H_2O$ to 1.4 mol, changing the amount of $FeSO_4 \cdot H_2O$ to 0.6 mol, changing the amount of $Li_2CO_3$ to 0.38 mol, and replacing 0.001 mol of $Mo(SO_4)_3$ with 0.12 mol of $MgSO_4$, the others were the same as those in preparation example 1.

Comparative Example 6

In addition to changing the amount of $MnSO_4 \cdot H_2O$ to 0.8 mol, replacing 0.7 mol of $FeSO_4 \cdot H_2O$ to 1.2 mol of $ZnSO_4$, changing the amount of $Li_2CO_3$ to 0.499 mol, and replacing 0.001 mol of $Mo(SO_4)_3$ with 0.001 mol of $MgSO_4$, the others were the same as those in preparation example 1.

Comparative Example 7

In addition to changing the amount of $MnSO_4 \cdot H_2O$ to 1.4 mol, changing the amount of $FeSO_4 \cdot H_2O$ to 0.6 mol, changing the amount of $Li_2CO_3$ to 0.534 mol, replacing 0.001 mol of $Mo(SO_4)_3$ with 0.001 mol of $MgSO_4$, changing the amount of phosphoric acid to 0.88 mol, changing the amount of $H_4SiO_4$ to 0.12 mol, and changing the amount of $NH_4HF_2$ to 0.025 mol, the others were the same as those in preparation example 1.

Comparative Example 8

In addition to changing the amount of $MnSO_4 \cdot H_2O$ to 1.2 mol, changing the amount of $FeSO_4 \cdot H_2O$ to 0.8 mol, changing the amount of $Li_2CO_3$ to 0.474 mol, replacing 0.001 mol of $Mo(SO_4)_3$ with 0.001 mol of $MgSO_4$, changing the amount of phosphoric acid to 0.93 mol, changing the amount of $H_4SiO_4$ to 0.07 mol, and changing the amount of $NH_4HF_2$ to 0.06 mol, the others were the same as those in preparation example 1.

A positive electrode active material, a binder PVDF and a conductive agent superconducting carbon black (Super-P) were mixed according to a mass ratio of 97%:1.5%:1.5%, are then dispersed in an N-methylpyrrolidone solvent to obtain slurry of the positive electrode active material with the solid content of 60% w/w.

Preparation of Positive Electrode Sheet

Example 1

Two surfaces of the current collector aluminium foil were evenly coated with the slurry of the positive electrode active material of preparation example 1 with a coating amount of 0.019 g/cm$^2$, vacuum drying was carried out at a high temperature of 100-120° C. for 14 h, and compacting was carried out by a roller press to obtain a positive electrode sheet P1.

Example 2

Two surfaces of the current collector aluminium foil were evenly coated with the slurry of the positive electrode active material of preparation example 55 with a coating amount of 0.019 g/cm$^2$, vacuum drying was carried out at a high temperature of 100-120° C. for 14 h, and compacting was carried out by a roller press to obtain a positive electrode sheet P2.

Example 3

One surface of the aluminium foil was evenly coated with the slurry of the positive electrode active material of preparation example 1 with a coating amount of 0.019 g/cm$^2$, the other surface of the aluminium foil was evenly coated with the slurry of the positive electrode active material of preparation example 55 with a coating amount of 0.019 g/cm$^2$, vacuum drying was carried out at a high temperature of 100-120° C. for 14 h, and compacting was carried out by a roller press to obtain a positive electrode sheet P3.

Example 4

Two surfaces of the current collector aluminium foil were evenly coated with the slurry of the positive electrode active material of preparation example 56 with a coating amount of 0.019 g/cm$^2$, and the others were the same as those in example 3 to obtain a positive electrode sheet P4.

Example 5

One surface of the aluminium foil was evenly coated with the slurry of the positive electrode active material of preparation example 1 with a coating amount of 0.019 g/cm$^2$, the other surface of the aluminium foil was evenly coated with the slurry of the positive electrode active material of preparation example 56 with a coating amount of 0.019 g/cm$^2$, and the others were the same as those in example 3 to obtain a positive electrode sheet P5.

Example 6

One surface of the aluminium foil was evenly coated with the slurry of the positive electrode active material of preparation example 55 with a coating amount of 0.019 g/cm$^2$, the other surface of the aluminium foil was evenly coated with the slurry of the positive electrode active material of preparation example 56 with a coating amount of 0.019 g/cm$^2$, and the others were the same as those in example 3 to obtain a positive electrode sheet P6.

Example 7

Two surfaces of the aluminium foil were each sequentially coated with the slurry of the positive electrode active material of preparation example 1 and the slurry of the positive electrode active material of preparation example 55, with a coating amount of each layer of slurry of 0.010 g/cm$^2$, then vacuum drying was carried out at a high temperature of 100-120° C. for 14 h, and compacting was carried out by a roller press to obtain a positive electrode sheet P7.

Example 8

Two surfaces of the aluminium foil were each sequentially coated with the slurry of the positive electrode active material of preparation example 55 and the slurry of the positive electrode active material of preparation example 1, with a coating amount of each layer of slurry of 0.010 g/cm$^2$, and the others were the same as those in example 7 to obtain a positive electrode sheet P8.

Example 9

Two surfaces of the aluminium foil were each sequentially coated with the slurry of the positive electrode active material of preparation example 1 and the slurry of the positive electrode active material of preparation example 56, with a coating amount of each layer of slurry of 0.010 g/cm$^2$, and the others were the same as those in example 7 to obtain a positive electrode sheet P9.

Example 10

Two surfaces of the aluminium foil were each sequentially coated with the slurry of the positive electrode active material of preparation example 56 and the slurry of the positive electrode active material of preparation example 1, with a coating amount of each layer of slurry of 0.010 g/cm$^2$, and the others were the same as those in example 7 to obtain a positive electrode sheet P10.

Example 11

Two surfaces of the aluminium foil were each sequentially coated with the slurry of the positive electrode active material of preparation example 55 and the slurry of the positive electrode active material of preparation example 56, with a coating amount of each layer of slurry of 0.010 g/cm$^2$, and the others were the same as those in example 7 to obtain a positive electrode sheet P11.

Example 12

Two surfaces of the aluminium foil were each sequentially coated with the slurry of the positive electrode active material of preparation example 56 and the slurry of the positive electrode active material of preparation example 55, with a coating amount of each layer of slurry of 0.010 g/cm$^2$, and the others were the same as those in example 7 to obtain a positive electrode sheet P12.

Example 13

A surface A of the aluminium foil was sequentially coated with the slurry of the positive electrode active material of preparation example 1 and the slurry of the positive electrode active material of preparation example 55, with a coating amount of each layer of slurry of 0.010 $g/cm^2$, a surface B of the aluminium foil was evenly coated with the slurry of the positive electrode active material of preparation example 1 with a coating amount of the slurry of 0.020 $g/cm^2$, then vacuum drying was carried out at a high temperature of 100-120° C. for 14 h, and compacting was carried out by a roller press to obtain a positive electrode sheet P13.

Example 14

A surface A of the aluminium foil was sequentially coated with the slurry of the positive electrode active material of preparation example 1 and the slurry of the positive electrode active material of preparation example 55, with a coating amount of each layer of slurry of 0.010 $g/cm^2$, a surface B of the aluminium foil was evenly coated with the slurry of the positive electrode active material of preparation example 55 with a coating amount of the slurry of 0.020 $g/cm^2$, and the others were the same as those in example 13 to obtain a positive electrode sheet P14.

Example 15

A surface A of the aluminium foil was sequentially coated with the slurry of the positive electrode active material of preparation example 1 and the slurry of the positive electrode active material of preparation example 55, with a coating amount of each layer of slurry of 0.010 $g/cm^2$, a surface B of the aluminium foil was evenly coated with the slurry of the positive electrode active material of preparation example 56 with a coating amount of the slurry of 0.020 $g/cm^2$, and the others were the same as those in example 13 to obtain a positive electrode sheet P15.

Example 16

A surface A of the aluminium foil was sequentially coated with the slurry of the positive electrode active material of preparation example 55 and the slurry of the positive electrode active material of preparation example 1, with a coating amount of each layer of slurry of 0.010 $g/cm^2$, a surface B of the aluminium foil was evenly coated with the slurry of the positive electrode active material of preparation example 1 with a coating amount of the slurry of 0.020 $g/cm^2$, and the others were the same as those in example 13 to obtain a positive electrode sheet P16.

Example 17

A surface A of the aluminium foil was sequentially coated with the slurry of the positive electrode active material of preparation example 55 and the slurry of the positive electrode active material of preparation example 1, with a coating amount of each layer of slurry of 0.010 $g/cm^2$, a surface B of the aluminium foil was evenly coated with the slurry of the positive electrode active material of preparation example 55 with a coating amount of the slurry of 0.020 $g/cm^2$, and the others were the same as those in example 13 to obtain a positive electrode sheet P17.

Example 18

A surface A of the aluminium foil was sequentially coated with the slurry of the positive electrode active material of preparation example 55 and the slurry of the positive electrode active material of preparation example 1, with a coating amount of each layer of slurry of 0.010 $g/cm^2$, a surface B of the aluminium foil was evenly coated with the slurry of the positive electrode active material of preparation example 56 with a coating amount of the slurry of 0.020 $g/cm^2$, and the others were the same as those in example 13 to obtain a positive electrode sheet P18.

Example 19

A surface A of the aluminium foil was sequentially coated with the slurry of the positive electrode active material of preparation example 1 and the slurry of the positive electrode active material of preparation example 56, with a coating amount of each layer of slurry of 0.010 $g/cm^2$, a surface B of the aluminium foil was evenly coated with the slurry of the positive electrode active material of preparation example 1 with a coating amount of the slurry of 0.020 $g/cm^2$, and the others were the same as those in example 13 to obtain a positive electrode sheet P19.

Example 20

A surface A of the aluminium foil was sequentially coated with the slurry of the positive electrode active material of preparation example 1 and the slurry of the positive electrode active material of preparation example 56, with a coating amount of each layer of slurry of 0.010 $g/cm^2$, a surface B of the aluminium foil was evenly coated with the slurry of the positive electrode active material of preparation example 55 with a coating amount of the slurry of 0.020 $g/cm^2$, and the others were the same as those in example 13 to obtain a positive electrode sheet P20.

Example 21

A surface A of the aluminium foil was sequentially coated with the slurry of the positive electrode active material of preparation example 1 and the slurry of the positive electrode active material of preparation example 56, with a coating amount of each layer of slurry of 0.010 $g/cm^2$, a surface B of the aluminium foil was evenly coated with the slurry of the positive electrode active material of preparation example 56 with a coating amount of the slurry of 0.020 $g/cm^2$, and the others were the same as those in example 13 to obtain a positive electrode sheet P21.

Example 22

A surface A of the aluminium foil was sequentially coated with the slurry of the positive electrode active material of preparation example 56 and the slurry of the positive electrode active material of preparation example 1, with a coating amount of each layer of slurry of 0.010 $g/cm^2$, a surface B of the aluminium foil was evenly coated with the slurry of the positive electrode active material of preparation example 1 with a coating amount of the slurry of 0.020 g/cm², and the others were the same as those in example 13 to obtain a positive electrode sheet P22.

Example 23

A surface A of the aluminium foil was sequentially coated with the slurry of the positive electrode active material of preparation example 56 and the slurry of the positive electrode active material of preparation example 1, with a coating amount of each layer of slurry of 0.010 g/cm², a surface B of the aluminium foil was evenly coated with the slurry of the positive electrode active material of preparation example 55 with a coating amount of the slurry of 0.020 g/cm², and the others were the same as those in example 13 to obtain a positive electrode sheet P23.

Example 24

A surface A of the aluminium foil was sequentially coated with the slurry of the positive electrode active material of preparation example 56 and the slurry of the positive electrode active material of preparation example 1, with a coating amount of each layer of slurry of 0.010 g/cm², a surface B of the aluminium foil was evenly coated with the slurry of the positive electrode active material of preparation example 56 with a coating amount of the slurry of 0.020 g/cm², and the others were the same as those in example 13 to obtain a positive electrode sheet P24.

Example 25

A surface A of the aluminium foil was sequentially coated with the slurry of the positive electrode active material of preparation example 55 and the slurry of the positive electrode active material of preparation example 56, with a coating amount of each layer of slurry of 0.010 g/cm², a surface B of the aluminium foil was evenly coated with the slurry of the positive electrode active material of preparation example 1 with a coating amount of the slurry of 0.020 g/cm², and the others were the same as those in example 13 to obtain a positive electrode sheet P25.

Example 26

A surface A of the aluminium foil was sequentially coated with the slurry of the positive electrode active material of preparation example 55 and the slurry of the positive electrode active material of preparation example 56, with a coating amount of each layer of slurry of 0.010 g/cm², a surface B of the aluminium foil was evenly coated with the slurry of the positive electrode active material of preparation example 55 with a coating amount of the slurry of 0.020 g/cm², and the others were the same as those in example 13 to obtain a positive electrode sheet P26.

Example 27

A surface A of the aluminium foil was sequentially coated with the slurry of the positive electrode active material of preparation example 55 and the slurry of the positive electrode active material of preparation example 56, with a coating amount of each layer of slurry of 0.010 g/cm², a surface B of the aluminium foil was evenly coated with the slurry of the positive electrode active material of preparation example 56 with a coating amount of the slurry of 0.020 g/cm², and the others were the same as those in example 13 to obtain a positive electrode sheet P27.

Example 28

A surface A of the aluminium foil was sequentially coated with the slurry of the positive electrode active material of preparation example 56 and the slurry of the positive electrode active material of preparation example 55, with a coating amount of each layer of slurry of 0.010 g/cm², a surface B of the aluminium foil was evenly coated with the slurry of the positive electrode active material of preparation example 1 with a coating amount of the slurry of 0.020 g/cm², and the others were the same as those in example 13 to obtain a positive electrode sheet P28.

Example 29

A surface A of the aluminium foil was sequentially coated with the slurry of the positive electrode active material of preparation example 56 and the slurry of the positive electrode active material of preparation example 55, with a coating amount of each layer of slurry of 0.010 g/cm², a surface B of the aluminium foil was evenly coated with the slurry of the positive electrode active material of preparation example 55 with a coating amount of the slurry of 0.020 g/cm², and the others were the same as those in example 13 to obtain a positive electrode sheet P29.

Example 30

A surface A of the aluminium foil was sequentially coated with the slurry of the positive electrode active material of preparation example 56 and the slurry of the positive electrode active material of preparation example 55, with a coating amount of each layer of slurry of 0.010 g/cm², a surface B of the aluminium foil was evenly coated with the slurry of the positive electrode active material of preparation example 56 with a coating amount of the slurry of 0.020 g/cm², and the others were the same as those in example 13 to obtain a positive electrode sheet P30.

Example 31

Two surfaces of the current collector aluminium foil were evenly coated with the slurry of the positive electrode active material of preparation example 57 with a coating amount of 0.019 g/cm², vacuum drying was carried out at a high temperature of 100-120° C. for 14 h, and compacting was carried out by a roller press to obtain a positive electrode sheet P31.

Example 32

Two surfaces of the current collector aluminium foil were evenly coated with the slurry of the positive electrode active material of preparation example 58 with a coating amount of 0.019 g/cm², vacuum drying was carried out at a high temperature of 100-120° C. for 14 h, and compacting was carried out by a roller press to obtain a positive electrode sheet P32.

Example 33

Two surfaces of the current collector aluminium foil were evenly coated with the slurry of the positive electrode active material of preparation example 59 with a coating amount of 0.019 g/cm², vacuum drying was carried out at a high temperature of 100-120° C. for 14 h, and compacting was carried out by a roller press to obtain a positive electrode sheet P33.

Example 34

Two surfaces of the current collector aluminium foil were evenly coated with the slurry of the positive electrode active material of preparation example 60 with a coating amount of 0.019 g/cm², vacuum drying was carried out at a high temperature of 100-120° C. for 14 h, and compacting was carried out by a roller press to obtain a positive electrode sheet P34.

Example 35

Two surfaces of the current collector aluminium foil were evenly coated with the slurry of the positive electrode active material of preparation example 61 with a coating amount of 0.019 g/cm², vacuum drying was carried out at a high temperature of 100-120° C. for 14 h, and compacting was carried out by a roller press to obtain a positive electrode sheet P35.

Example 36

Two surfaces of the current collector aluminium foil were evenly coated with the slurry of the positive electrode active material of preparation example 62 with a coating amount of 0.019 g/cm², vacuum drying was carried out at a high temperature of 100-120° C. for 14 h, and compacting was carried out by a roller press to obtain a positive electrode sheet P36.

Example 37

Two surfaces of the current collector aluminium foil were evenly coated with the slurry of the positive electrode active material of preparation example 63 with a coating amount of 0.019 g/cm², vacuum drying was carried out at a high temperature of 100-120° C. for 14 h, and compacting was carried out by a roller press to obtain a positive electrode sheet P37.

Example 38

Two surfaces of the current collector aluminium foil were evenly coated with the slurry of the positive electrode active material of preparation example 64 with a coating amount of 0.019 g/cm², and the others were the same as those in example 37 to obtain a positive electrode sheet P38.

Example 39

Two surfaces of the current collector aluminium foil were evenly coated with the slurry of the positive electrode active material of preparation example 65 with a coating amount of 0.019 g/cm², and the others were the same as those in example 37 to obtain a positive electrode sheet P39.

Example 40

Two surfaces of the current collector aluminium foil were evenly coated with the slurry of the positive electrode active material of preparation example 66 with a coating amount of 0.019 g/cm², and the others were the same as those in example 37 to obtain a positive electrode sheet P40.

Example 41

Two surfaces of the current collector aluminium foil were evenly coated with the slurry of the positive electrode active material of preparation example 67 with a coating amount of 0.019 g/cm², and the others were the same as those in example 37 to obtain a positive electrode sheet P41.

Example 42

Two surfaces of the current collector aluminium foil were evenly coated with the slurry of the positive electrode active material of preparation example 68 with a coating amount of 0.019 g/cm², and the others were the same as those in example 37 to obtain a positive electrode sheet P42.

The parameters of the above positive electrode sheets are shown in Table 3.

TABLE 3

Parameters of positive electrode sheet

| Positive electrode sheet | Number of positive electrode film layers on surface I of aluminium foil | Positive electrode active material on surface I of aluminium foil | Number of positive electrode film layers on surface II of aluminium foil | Positive electrode active material on surface II of aluminium foil | Thickness of positive electrode sheet (mm) | Density of positive electrode sheet (g/cm³) | Mass content of first positive electrode active material in positive electrode active material# | Mass content of second positive electrode active material in positive electrode active material# |
|---|---|---|---|---|---|---|---|---|
| Positive electrode sheet P1 | 1 | Preparation Example 1 | 1 | Preparation Example 1 | 0.168 | 2.50 | 100% | NA |
| Positive electrode sheet P2 | 1 | Preparation Example 55 | 1 | Preparation Example 55 | 0.138 | 3.10 | NA | 100% |
| Positive electrode sheet P3 | 1 | Preparation Example 1 | 1 | Preparation Example 55 | 0.169 | 2.50 | 50% | 50% |
| Positive electrode sheet P4 | 1 | Preparation Example 56 | 1 | Preparation Example 56 | 0.151 | 2.80 | 50% | 50% |

TABLE 3-continued

Parameters of positive electrode sheet

| Positive electrode sheet | Number of positive electrode film layers on surface I of aluminium foil | Positive electrode active material on surface I of aluminium foil | Number of positive electrode film layers on surface II of aluminium foil | Positive electrode active material on surface II of aluminium foil | Thickness of positive electrode sheet (mm) | Density of positive electrode sheet (g/cm$^3$) | Mass content of first positive electrode active material in positive electrode active material# | Mass content of second positive electrode active material in positive electrode active material# |
|---|---|---|---|---|---|---|---|---|
| Positive electrode sheet P5 | 1 | Preparation Example 1 | 1 | Preparation Example 56 | 0.168 | 2.50 | 75% | 25% |
| Positive electrode sheet P6 | 1 | Preparation Example 55 | 1 | Preparation Example 56 | 0.145 | 2.95 | 25% | 75% |
| Positive electrode sheet P7 | 2 | 1st layer*: preparation example 1 2nd layer*: preparation example 55 | 2 | 1st layer: preparation example 1 2nd layer: preparation example 55 | 0.169 | 2.50 | 50% | 50% |
| Positive electrode sheet P8 | 2 | 1st layer: preparation example 55 2nd layer: preparation example 1 | 2 | 1st layer: preparation example 55 2nd layer: preparation example 1 | 0.169 | 2.50 | 50% | 50% |
| Positive electrode sheet P9 | 2 | 1st layer: preparation example 1 2nd layer: preparation example 56 | 2 | 1st layer: preparation example 1 2nd layer: preparation example 56 | 0.168 | 2.50 | 75% | 25% |
| Positive electrode sheet P10 | 2 | 1st layer: preparation example 56 2nd layer: preparation example 1 | 2 | 1st layer: preparation example 56 2nd layer: preparation example 1 | 0.161 | 2.65 | 75% | 25% |
| Positive electrode sheet P11 | 2 | 1st layer: preparation example 55 2nd layer: preparation example 56 | 2 | 1st layer: preparation example 55 2nd layer: preparation example 56 | 0.145 | 2.95 | 25% | 75% |
| Positive electrode sheet P12 | 2 | 1st layer: preparation example 56 2nd layer: preparation example 55 | 2 | 1st layer: preparation example 56 2nd layer: preparation example 55 | 0.145 | 2.95 | 25% | 75% |
| Positive electrode sheet P13 | 2 | 1st layer: preparation example 1 2nd layer: preparation example 55 | 1 | Preparation Example 1 | 0.168 | 2.50 | 75% | 25% |
| Positive electrode sheet P14 | 2 | 1st layer: preparation example 1 2nd layer: preparation example 55 | 1 | Preparation Example 55 | 0.168 | 2.50 | 25% | 75% |
| Positive electrode sheet P15 | 2 | 1st layer: preparation example 1 2nd layer: preparation example 55 | 1 | Preparation Example 56 | 0.169 | 2.50 | 50% | 50% |
| Positive electrode sheet P16 | 2 | 1st layer: preparation example 55 2nd layer: preparation example 1 | 1 | Preparation Example 1 | 0.168 | 2.50 | 75% | 25% |

TABLE 3-continued

Parameters of positive electrode sheet

| Positive electrode sheet | Number of positive electrode film layers on surface I of aluminium foil | Positive electrode active material on surface I of aluminium foil | Number of positive electrode film layers on surface II of aluminium foil | Positive electrode active material on surface II of aluminium foil | Thickness of positive electrode sheet (mm) | Density of positive electrode sheet (g/cm$^3$) | Mass content of first positive electrode active material in positive electrode active material# | Mass content of second positive electrode active material in positive electrode active material# |
|---|---|---|---|---|---|---|---|---|
| Positive electrode sheet P17 | 2 | 1st layer: preparation example 55 2nd layer: preparation example 1 | 1 | Preparation Example 55 | 0.145 | 2.95 | 25% | 75% |
| Positive electrode sheet P18 | 2 | 1st layer: preparation example 55 2nd layer: preparation example 1 | 1 | Preparation Example 56 | 0.151 | 2.80 | 50% | 50% |
| Positive electrode sheet P19 | 2 | 1st layer: preparation example 1 2nd layer: preparation example 56 | 1 | Preparation Example 1 | 0.168 | 2.50 | 87.5% | 12.5% |
| Positive electrode sheet P20 | 2 | 1st layer: preparation example 1 2nd layer: preparation example 56 | 1 | Preparation Example 55 | 0.169 | 2.50 | 37.5% | 62.5% |
| Positive electrode sheet P21 | 2 | 1st layer: preparation example 1 2nd layer: preparation example 56 | 1 | Preparation Example 56 | 0.168 | 2.50 | 62.5% | 37.5% |
| Positive electrode sheet P22 | 2 | 1st layer: preparation example 56 2nd layer: preparation example 1 | 1 | Preparation Example 1 | 0.168 | 2.50 | 87.5% | 12.5% |
| Positive electrode sheet P23 | 2 | 1st layer: preparation example 56 2nd layer: preparation example 1 | 1 | Preparation Example 55 | 0.148 | 2.88 | 37.5% | 62.5% |
| Positive electrode sheet P24 | 2 | 1st layer: preparation example 56 2nd layer: preparation example 1 | 1 | Preparation Example 56 | 0.155 | 2.73 | 62.5% | 37.5% |
| Positive electrode sheet P25 | 2 | 1st layer: preparation example 55 2nd layer: preparation example 56 | 1 | Preparation Example 1 | 0.168 | 2.50 | 62.5% | 37.5% |
| Positive electrode sheet P26 | 2 | 1st layer: preparation example 55 2nd layer: preparation example 56 | 1 | Preparation Example 55 | 0.142 | 3.03 | 12.5% | 87.5% |
| Positive electrode sheet P27 | 2 | 1st layer: preparation example 55 2nd layer: preparation example 56 | 1 | Preparation Example 56 | 0.148 | 2.88 | 37.5% | 62.5% |

TABLE 3-continued

Parameters of positive electrode sheet

| Positive electrode sheet | Number of positive electrode film layers on surface I of aluminium foil | Positive electrode active material on surface I of aluminium foil | Number of positive electrode film layers on surface II of aluminium foil | Positive electrode active material on surface II of aluminium foil | Thickness of positive electrode sheet (mm) | Density of positive electrode sheet (g/cm$^3$) | Mass content of first positive electrode active material in positive electrode active material# | Mass content of second positive electrode active material in positive electrode active material# |
|---|---|---|---|---|---|---|---|---|
| Positive electrode sheet P28 | 2 | 1st layer: preparation example 56 2nd layer: preparation example 55 | 1 | Preparation Example 1 | 0.168 | 2.50 | 62.5% | 37.5% |
| Positive electrode sheet P29 | 2 | 1st layer: preparation example 56 2nd layer: preparation example 55 | 1 | Preparation Example 55 | 0.142 | 3.03 | 12.5% | 87.5% |
| Positive electrode sheet P30 | 2 | 1st layer: preparation example 56 2nd layer: preparation example 55 | 1 | Preparation Example 56 | 0.148 | 2.88 | 37.5% | 62.5% |
| Positive electrode sheet P31 | 1 | Preparation Example 57 | 1 | Preparation Example 57 | 0.138 | 3.1 | NA | 100% |
| Positive electrode sheet P32 | 1 | Preparation Example 58 | 1 | Preparation Example 58 | 0.138 | 3.1 | NA | 100% |
| Positive electrode sheet P33 | 1 | Preparation Example 59 | 1 | Preparation Example 59 | 0.138 | 3.1 | NA | 100% |
| Positive electrode sheet P34 | 1 | Preparation Example 60 | 1 | Preparation Example 60 | 0.138 | 3.1 | NA | 100% |
| Positive electrode sheet P35 | 1 | Preparation Example 61 | 1 | Preparation Example 61 | 0.138 | 3.1 | NA | 100% |
| Positive electrode sheet P36 | 1 | Preparation Example 62 | 1 | Preparation Example 62 | 0.138 | 3.1 | NA | 100% |
| Positive electrode sheet P37 | 1 | Preparation Example 63 | 1 | Preparation Example 63 | 0.151 | 2.8 | 50% | 50% |
| Positive electrode sheet P38 | 1 | Preparation Example 64 | 1 | Preparation Example 64 | 0.151 | 2.8 | 50% | 50% |
| Positive electrode sheet P39 | 1 | Preparation Example 65 | 1 | Preparation Example 65 | 0.151 | 2.8 | 50% | 50% |
| Positive electrode sheet P40 | 1 | Preparation Example 66 | 1 | Preparation Example 66 | 0.151 | 2.8 | 50% | 50% |

TABLE 3-continued

Parameters of positive electrode sheet

| Positive electrode sheet | Number of positive electrode film layers on surface I of aluminium foil | Positive electrode active material on surface I of aluminium foil | Number of positive electrode film layers on surface II of aluminium foil | Positive electrode active material on surface II of aluminium foil | Thickness of positive electrode sheet (mm) | Density of positive electrode sheet (g/cm$^3$) | Mass content of first positive electrode active material in positive electrode active material# | Mass content of second positive electrode active material in positive electrode active material# |
|---|---|---|---|---|---|---|---|---|
| Positive electrode sheet P41 | 1 | Preparation Example 67 | 1 | Preparation Example 67 | 0.151 | 2.8 | 50% | 50% |
| Positive electrode sheet P42 | 1 | Preparation Example 68 | 1 | Preparation Example 68 | 0.151 | 2.8 | 50% | 50% |

"*": The 1st layer refers to the layer in contact with the surface of the aluminium foil, and the 2nd layer refers to the layer provided on the 1st layer.
"#": The first positive electrode active material refers to the positive electrode active material prepared in preparation example 1, and the second positive electrode active material refers to the positive electrode active material prepared in preparation example 55, preparation example 57, preparation example 58, preparation example 59, preparation example 60, preparation example 61 or preparation example 62.

Preparation of Negative Electrode Sheet

A negative electrode active material artificial graphite, a conductive agent superconducting carbon black (Super-P), a binder styrene butadiene rubber (SBR) and a thickener sodium carboxymethyl cellulose (CMC-Na) were dissolved in deionized water according to a mass ratio of 95%:1.5%:1.8%:1.7%, and were fully stirred and evenly mixed to obtain a negative electrode slurry with the viscosity of 3000 mPa·s and a solid content of 52%; and a 6 μm negative electrode current collector copper foil was coated with the negative electrode slurry and baked at 100° C. for 4 hours to be dried, and rolling was carried out to obtain a negative electrode sheet with the compacted density of 1.75 g/cm$^3$.

Separator

A polypropylene film was adopted.

Preparation of Electrolyte Solution

Ethylene carbonate, dimethyl carbonate and 1,2-propylene carbonate were mixed according to a volume ratio of 1:1:1, and then LiPF$_6$ was uniformly dissolved in the above solution to obtain an electrolyte solution. In this electrolyte solution, the concentration of LiPF$_6$ was 1 mol/L.

Preparation of Full Battery

Using the above-mentioned positive electrode sheet, according to the sequence of the negative electrode sheet, the separator and the positive electrode sheet, a bare battery cell was formed by a winding method, and an aluminium tab and a copper tab were punched out respectively to obtain a bare battery cell; and copper and the copper tabs as well as aluminium and the aluminium tabs of the two bare battery cells were welded to a battery top cover together, after being wrapped for insulation, the bare battery cells were placed into an aluminium shell, the top cover and the aluminium shell were welded to form a dry battery cell, the electrolyte solution was injected after the dry battery cell was baked to remove water, so as to perform formation and aging on the battery, and correspondingly a full battery was obtained. Battery structures manufactured from the positive electrode sheets P1, P2, P3, P8, P10, P11, P12, P17, P18, P23, P24, P26, and P27 are as shown in FIGS. 7-19.

Preparation of Button Battery

The above-mentioned positive electrode sheet was assembled with a negative electrode and the electrolyte solution into a button battery (hereinafter also referred to as "button battery") in a button battery box.

I. Property Test of Positive Electrode Active Material

1. Measurement of Chemical Formula of Positive Electrode Active Material

An aberration corrected scanning transmission electron microscopy (ACSTEM) was used to perform high-spatial-resolution characterization on an internal microstructure and a surface structure of a positive electrode active material, and combined with three-dimensional reconstruction technology, a chemical formula of the positive electrode active material was obtained.

2. Measurement Method of Lattice Change Rate

In a constant temperature environment of 25° C., a positive electrode active material sample was placed in an XRD (with the model being Bruker D8 Discover), the sample was tested at 1°/min, test data was managed and analyzed, and with reference to a standard PDF card, lattice constants a0, b0, c0, and v0 at the time were calculated (a0, b0, and c0 represent the lengths in all aspects of a unit cell, and v0 represents the volume of a unit cell, which can be obtained directly from XRD refined results).

The positive electrode active material sample was prepared into a positive electrode sheet according to the method for preparing the positive electrode sheet P1, then a button battery was prepared according to the above-mentioned "preparation of button battery", and the button battery was charged at a small rate of 0.05 C until a current was decreased to 0.01 C. Then the positive electrode sheet in the button battery was removed and soaked in DMC for 8 h. After oven drying, powder was scraped off, and particles with a particle size less than 500 nm were sieved. A sample was taken and a lattice constant v1 thereof was calculated in the same way as the fresh sample tested above. The lattice change rate before and after complete de-intercalation of lithium was calculated by (v0−v1)/v0×100% and shown in the table.

3. Measurement Method of Li/Mn Antisite Defect Concentration

The Li/Mn antisite defect concentration was obtained by comparing the XRD results tested in the "measurement method of lattice change rate" with the PDF (Powder Diffraction File) card of a standard crystal. Specifically, the XRD results tested in the "measurement method of lattice change rate" were imported into General Structural Analysis System (GSAS) software, the refined results were automatically obtained, which included the occupancy of different atoms, and the Li/Mn antisite defect concentration was obtained by reading the refined results.

4. Measurement Method of Surface Oxygen Valence 5 g of positive electrode active material sample was taken and prepared into a positive electrode sheet according to the method for preparing the positive electrode sheet P1, and then a button battery was prepared according to the above-mentioned "preparation of button battery". The button battery was charged at a small rate of 0.05 C until a current was decreased to 0.01 C. Then the positive electrode sheet in the button battery was removed and soaked in DMC for 8 h. After oven drying, powder was scraped off, and particles with a particle size less than 500 nm were sieved. The obtained particles were measured by electron energy loss spectroscopy (EELS, the instrument used is Talos F200S) to obtain the energy loss near-edge structure (ELNES), which reflects the density of states and energy level distribution of elements. Based on the density of states and energy level distribution, the valence band density of states was integrated to calculate the number of electrons occupied, thereby deriving the valence of surface oxygen after charging.

5. Measurement Method of Compacted Density 5 g of positive electrode active material powder was placed in a special compaction mold (CARVER mold, 13 mm), and then the mold was placed on a compacted density test instrument. A pressure of 3 T was applied, a thickness of the powder under the pressure (thickness after pressure relief) was read on the device, and the compacted density was calculated by $\rho=m/v$.

6. Measurement Method of Dissolution of Mn (and Fe Doped at Mn Site) after Cycling A positive electrode active material sample was prepared into a positive electrode sheet according to the method for preparing the positive electrode sheet P1, and then a full battery was prepared according to the above-mentioned "preparation of full battery".

The full battery that was cycled at 45° C. until the capacity was attenuated to 80% was discharged to a cut-off voltage of 2.0 V at a rate of 0.1 C. Then the battery was disassembled, the negative electrode sheet was removed, 30 circular pieces of unit area (1540.25 mm²) were randomly selected on the negative electrode sheet, and the inductively coupled plasma emission spectrometry (ICP) was tested on Agilent ICP-OES730. The amount of Fe (if Fe is doped at the position of Mn of the positive electrode active material) and Mn was calculated from the ICP results, thereby calculating the amount of Mn (and Fe doped at the position of Mn) dissolved out after cycling. The test standard is based on EPA-6010D-2014.

7. Measurement Method of Initial Gram Capacity of Button Battery

At 2.5-4.3 V, the button batteries were charged to 4.3 V at 0.1 C, then charged at a constant voltage of 4.3 V until a current was less than or equal to 0.05 mA, left to stand for 5 min, and then discharged at 0.1 C to 2.0 V. The discharge capacity at this time was the initial gram capacity, recorded as D0.

8. Measurement Method of Capacity Rate of Constant-Current Charged at 3 C

In a constant-temperature environment of 25° C., fresh full batteries were allowed to stand for 5 min, and discharged to 2.5 V at ⅓ C. The batteries were allowed to stand for 5 min, charged to 4.3 V at ⅓ C, and then charged at a constant voltage of 4.3 V until a current is less than or equal to 0.05 mA. After standing for 5 min, the charging capacity at this time was recorded as C0. The battery was discharged to 2.5V at ⅓ C, let stand for 5 min, then charged to 4.3V at 3 C, and let stand for 5 minutes. The charging capacity at this time was recorded as C1. The capacity rate of constant-current charged at 3 C was C1/C0×100%.

The higher the capacity rate of constant-current charged at 3 C is, the better the rate performance of the battery will be.

9. Full Battery Cycling Performance Test at 45° C.

In a constant-temperature environment of 45° C., at 2.5-4.3 V, the full batteries were charged to 4.3 V at 1 C, and then charged at a constant voltage of 4.3 V until a current was less than or equal to 0.05 mA. The batteries were allowed to stand for 5 min, and then discharged to 2.5 V at 1 C, and the discharging capacity at this time was recorded as D0. The afore-mentioned charge-discharge cycle was repeated until the discharging capacity was reduced to 80% of D0. The number of cycles the battery had gone through at this time was recorded.

10. Full Battery Expansion Test at 60° C.

The full batteries were stored at 100% state of charge (SOC) at 60° C. The open circuit voltage (OCV) and AC internal resistance (IMP) of the battery cells were measured before, after and during storage to monitor SOC, and the battery cell volume was measured. The whole battery was taken out after every 48 h of storage, and the open circuit voltage (OCV) and internal resistance (IMP) were tested after standing for 1 h. The volume of the battery cell was measured by displacement of water after cooling to room temperature. In the displacement of water, the gravity $F_1$ of the battery cell was measured firstly with a balance that automatically performs unit conversion of the dial data. Then the battery cell was completely placed in deionized water (the density is known to be 1 g/cm³). The gravity $F_2$ of the battery cell at this time was measured. The buoyancy $F_{floating}$ on the battery cell is $F_1-F_2$, and then according to Archimedes' principle $F_{floating}=\rho \times g \times V_{displacement}$, the battery cell volume $V=(F_1-F_2)/(\rho \times g)$ is calculated.

From the OCV and IMP test results, it can be seen that the batteries of the examples always maintain an SOC of 99% or higher during the experiment till the end of storage.

After 30 days of storage, the battery cell volume was measured and the percentage increase in the battery cell volume after storage relative to the battery cell volume before storage was calculated.

In addition, the residual capacity of the battery cell is measured. At 2.5-4.3 V, the full batteries were charged to 4.3 V at 1 C, and then charged at a constant voltage of 4.3 V until a current was less than or equal to 0.05 mA. After standing for 5 min, the charging capacity at this time was recorded as the residual capacity of the battery cell.

Table 4 shows the composition of the positive electrode active materials of preparation examples 1-11 and comparative examples 1-8. Table 5 shows performance data of the positive electrode active materials of preparation examples 1-11 and comparative examples 1-8, or the button battery or the full battery measured according to the above-mentioned performance test methods. Table 6 shows the composition of the positive electrode active materials of preparation examples 12-27. Table 7 shows performance data of the positive electrode active materials of preparation examples 12-27, or the button battery or the full battery measured according to the above-mentioned performance test methods. Table 8 shows performance data of the positive electrode active materials of preparation examples 28-41, or the button battery or the full battery measured according to the above-mentioned performance test methods. Table 9 shows performance data of the positive electrode active materials of preparation examples 42-54, or the button battery or the full battery measured according to the above-mentioned performance test methods.

TABLE 4

Chemical formulas of positive electrode active materials of preparation examples 1-11 and comparative examples 1-8

| | Chemical formula |
|---|---|
| Preparation Example 1 | $Li_{0.994}Mo_{0.001}Mn_{0.65}Fe_{0.35}P_{0.999}Si_{0.001}O_{3.999}F_{0.001}$ |
| Preparation Example 2 | $Li_{0.977}Mg_{0.001}Mn_{0.65}Fe_{0.34}Ti_{0.01}P_{0.999}N_{0.001}O_{3.999}F_{0.001}$ |
| Preparation Example 3 | $Li_{0.992}W_{0.001}Mn_{0.65}Fe_{0.35}P_{0.999}S_{0.001}O_{3.999}F_{0.001}$ |
| Preparation Example 4 | $Li_{0.997}Al_{0.001}Mn_{0.65}Fe_{0.35}P_{0.999}Si_{0.001}O_{3.999}C_{10.001}$ |
| Preparation Example 5 | $Li_{0.993}Nb_{0.001}Mn_{0.65}Fe_{0.345}V_{0.005}P_{0.999}S_{0.001}O_{3.999}F_{0.001}$ |
| Preparation Example 6 | $Li_{0.993}Nb_{0.001}Mn_{0.65}Fe_{0.34}V_{0.005}Mg_{0.005}P_{0.999}S_{0.001}O_{3.999}F_{0.001}$ |
| Preparation Example 7 | $Li_{0.993}Nb_{0.001}Mn_{0.65}Fe_{0.34}V_{0.005}C_{0.005}P_{0.999}S_{0.001}O_{3.999}F_{0.001}$ |
| Preparation Example 8 | $Li_{0.993}Nb_{0.001}Mn_{0.65}Fe_{0.34}V_{0.005}Ni_{0.005}P_{0.999}S_{0.001}O_{3.999}F_{0.001}$ |
| Preparation Example 9 | $Li_{0.991}Nb_{0.001}Mn_{0.65}Fe_{0.349}Ti_{0.001}P_{0.999}S_{0.001}O_{3.999}C_{10.001}$ |
| Preparation Example 10 | $Li_{0.995}Nb_{0.001}Mn_{0.65}Fe_{0.34}V_{0.005}Mg_{0.005}P_{0.999}Si_{0.001}O_{3.999}Bf_{0.001}$ |
| Preparation Example 11 | $Li_{0.998}Mg_{0.001}Mn_{0.65}Fe_{0.345}V_{0.005}P_{0.999}Si_{0.001}O_{3.999}B_{10.001}$ |
| Comparative Example 1 | $LiMnPO_4$ |
| Comparative Example 2 | $LiMn_{0.85}Fe_{0.15}PO_4$ |
| Comparative Example 3 | $Li_{0.990}Mg_{0.005}Mn_{0.95}Zn_{0.05}PO_4$ |
| Comparative Example 4 | $Li_{0.90}Nb_{0.01}Mn_{0.6}Fe_{0.4}PO_{3.95}F_{0.05}$ |
| Comparative Example 5 | $Li_{0.76}Mg_{0.12}Mn_{0.7}Fe_{0.3}P_{0.999}Si_{0.001}O_{3.999}F_{0.001}$ |
| Comparative Example 6 | $Li_{0.998}Mg_{0.001}Mn_{0.4}Zn_{0.6}P_{0.999}Si_{0.001}O_{3.999}F_{0.001}$ |
| Comparative Example 7 | $Li_{1.068}Mg_{0.001}Mn_{0.7}Fe_{0.3}P_{0.88}Si_{0.12}O_{3.95}F_{0.05}$ |
| Comparative Example 8 | $Li_{0.948}Mg_{0.001}Mn_{0.6}Fe_{0.4}P_{0.93}Si_{0.07}O_{3.88}F_{0.12}$ |

TABLE 5

Performance data of positive electrode active materials of preparation examples 1-11 and comparative examples 1-8, or button battery or full battery measured according to above-mentioned performance test methods

| | Lattice change rate (%) | Li/Mn antisite defect concentration (%) | Surface oxygen valence | Compacted density (g/cm³) | Dissolution of Mn and Fe after cycling (ppm) | Initial gram capacity of button battery (mAh/g) | Capacity rate of constant-current charged at 3 C (%) | Cycle number for 80% of capacity retention rate at 4.5° C. | Battery cell expansion rate (%) after storage at 60° C. |
|---|---|---|---|---|---|---|---|---|---|
| Comparative Example 1 | 11.4 | 5.2 | −1.55 | 1.7 | 2060 | 125.6 | 50.1 | 121 | 48.6 |
| Comparative Example 2 | 10.6 | 4.3 | −1.51 | 1.87 | 1510 | 126.4 | 50.4 | 129 | 37.3 |
| Comparative Example 3 | 10.8 | 3.6 | −1.64 | 1.88 | 1028 | 134.7 | 51.7 | 134 | 31.9 |
| Comparative Example 4 | 9.7 | 2.4 | −1.71 | 1.93 | 980 | 141.3 | 62.3 | 148 | 30.8 |
| Comparative Example 5 | 5.6 | 1.8 | −1.81 | 1.98 | 873 | 110.8 | 50.2 | 387 | 21.4 |
| Comparative Example 6 | 3.7 | 1.5 | −1.80 | 2.01 | 574 | 74.3 | 65.8 | 469 | 15.8 |
| Comparative Example 7 | 7.8 | 1.5 | −1.75 | 2.05 | 447 | 139.4 | 64.3 | 396 | 18.3 |
| Comparative Example 8 | 8.4 | 1.4 | −1.79 | 2.16 | 263 | 141.7 | 63.9 | 407 | 22.7 |
| Preparation Example 1 | 6.3 | 1.2 | −1.82 | 2.21 | 192 | 156.2 | 68.1 | 552 | 8.4 |
| Preparation Example 2 | 6.8 | 1.1 | −1.85 | 2.25 | 161 | 153.4 | 75.1 | 583 | 7.5 |
| Preparation Example 3 | 6.4 | 0.9 | −1.86 | 2.31 | 144 | 154.6 | 76.7 | 646 | 8.6 |
| Preparation Example 4 | 5.5 | 0.9 | −1.89 | 2.38 | 125 | 153.6 | 78.4 | 638 | 8.3 |
| Preparation Example 5 | 5.3 | 0.7 | −1.98 | 2.45 | 102 | 153.8 | 84.5 | 769 | 7.8 |

TABLE 5-continued

Performance data of positive electrode active materials of preparation examples 1-11 and comparative examples 1-8, or button battery or full battery measured according to above-mentioned performance test methods

| | Lattice change rate (%) | Li/Mn antisite defect concentration (%) | Surface oxygen valence | Compacted density (g/cm$^3$) | Dissolution of Mn and Fe after cycling (ppm) | Initial gram capacity of button battery (mAh/g) | Capacity rate of constant-current charged at 3 C (%) | Cycle number for 80% of capacity retention rate at 4.5° C. | Battery cell expansion rate (%) after storage at 60° C. |
|---|---|---|---|---|---|---|---|---|---|
| Preparation Example 6 | 2.4 | 0.7 | −1.95 | 2.47 | 88 | 157.5 | 92.5 | 747 | 6.4 |
| Preparation Example 7 | 2.2 | 0.6 | −1.96 | 2.49 | 85 | 158.5 | 94.8 | 858 | 6.3 |
| Preparation Example 8 | 3.4 | 0.5 | −1.98 | 2.51 | 79 | 157.6 | 93.8 | 726 | 6.2 |
| Preparation Example 9 | 3.8 | 0.5 | −1.96 | 2.45 | 86 | 146.8 | 90.3 | 686 | 6.8 |
| Preparation Example 10 | 4.0 | 0.6 | −1.97 | 2.46 | 103 | 155.7 | 91.2 | 638 | 6.5 |
| Preparation Example 11 | 3.6 | 0.7 | −1.95 | 2.46 | 112 | 155.8 | 92.6 | 587 | 6.4 |

TABLE 6

Chemical formulas and element ratios of positive electrode active materials of preparation examples 12-27

| | Chemical formula | (1 − y):y | a:x |
|---|---|---|---|
| Preparation Example 12 | $Li_{0.997}Mg_{0.001}Mn_{0.68}Fe_{0.3}V_{0.02}P_{0.999}N_{0.001}O_{3.999}F_{0.001}$ | 2.26 | 997 |
| Preparation Example 13 | $Li_{0.997}Mg_{0.001}Mn_{0.58}Fe_{0.4}V_{0.02}P_{0.999}N_{0.001}O_{3.999}F_{0.001}$ | 1.45 | 997 |
| Preparation Example 14 | $Li_{0.997}Mg_{0.001}Mn_{0.65}Fe_{0.3}V_{0.05}P_{0.999}N_{0.001}O_{3.999}F_{0.001}$ | 2.17 | 997 |
| Preparation Example 15 | $Li_{0.988}Mg_{0.005}Mn_{0.6}Fe_{0.35}V_{0.05}P_{0.999}S_{0.001}O_{3.999}F_{0.001}$ | 1.71 | 197.6 |
| Preparation Example 16 | $Li_{0.984}Mg_{0.005}Mn_{0.6}Fe_{0.35}V_{0.05}P_{0.995}S_{0.005}O_{3.999}F_{0.001}$ | 1.71 | 196.8 |
| Preparation Example 17 | $Li_{0.984}Mg_{0.005}Mn_{0.6}Fe_{0.35}V_{0.05}P_{0.999}S_{0.001}O_{3.995}F_{0.005}$ | 1.71 | 196.8 |
| Preparation Example 18 | $Li_{0.984}Mg_{0.005}Mn_{0.65}Fe_{0.25}V_{0.05}C_{00.05}P_{0.999}S_{0.001}O_{3.995}F_{0.005}$ | 2.60 | 196.8 |
| Preparation Example 19 | $Li_{0.984}Mg_{0.005}Mn_{0.65}Fe_{0.20}V_{0.05}C_{00.10}P_{0.999}S_{0.001}O_{3.995}F_{0.005}$ | 3.25 | 196.8 |
| Preparation Example 20 | $Li_{0.984}Mg_{0.005}Mn_{0.75}Fe_{0.05}V_{0.05}C_{00.15}P_{0.999}S_{0.001}O_{3.995}F_{0.005}$ | 15.0 | 196.8 |
| Preparation Example 21 | $Li_{0.984}Mg_{0.005}Mn_{0.65}Fe_{0.25}V_{0.05}Ni_{0.05}P_{0.999}S_{0.001}O_{3.995}F_{0.005}$ | 2.60 | 196.8 |
| Preparation Example 22 | $Li_{0.984}Mg_{0.005}Mn_{0.75}Fe_{0.10}V_{0.05}Ni_{0.10}P_{0.999}S_{0.001}O_{3.995}F_{0.005}$ | 7.50 | 196.8 |
| Preparation Example 23 | $Li_{0.984}Mg_{0.005}Mn_{0.7}Fe_{0.15}V_{0.05}C_{00.10}P_{0.999}S_{0.001}O_{3.995}F_{0.005}$ | 4.67 | 196.8 |
| Preparation Example 24 | $Li_{0.984}Mg_{0.005}Mn_{0.6}Fe_{0.25}V_{0.05}Co_{0.10}P_{0.999}S_{0.001}O_{3.995}F_{0.005}$ | 2.40 | 196.8 |
| Preparation Example 25 | $Li_{0.984}Mg_{0.005}Mn_{0.5}Fe_{0.35}V_{0.05}C_{00.10}P_{0.999}S_{0.001}O_{3.995}F_{0.005}$ | 1.43 | 196.8 |
| Preparation Example 26 | $Li_{1.01}Mg_{0.005}Mn_{0.7}Fe_{0.15}V_{0.05}C_{00.10}P_{0.9}Si_{0.1}O_{3.92}F_{0.08}$ | 4.67 | 202 |
| Preparation Example 27 | $Li_{0.97}Mg_{0.005}Mn_{0.7}Fe_{0.15}V_{0.05}C_{00.10}P_{0.92}Si_{0.08}O_{3.9}F_{0.1}$ | 4.67 | 194 |

TABLE 7

Performance data of positive electrode active materials of preparation examples 12-27, or button battery or full battery measured according to above-mentioned performance test methods

| | Lattice change rate (%) | Li/Mn antisite defect concentration (%) | Surface oxygen valence | Compacted density (g/cm³) | Dissolution of Mn and Fe after cycling (ppm) | Initial gram capacity of button battery (mAh/g) | Capacity rate of constant-current charged at 3 C (%) | Cycle number for 80% of capacity retention rate at 45° C. | Battery cell expansion rate (%) after storage at 60° C. |
|---|---|---|---|---|---|---|---|---|---|
| Preparation Example 12 | 7.4 | 0.5 | −1.96 | 2.45 | 92 | 153.3 | 97.2 | 948 | 6.7 |
| Preparation Example 13 | 7.6 | 0.4 | −1.98 | 2.48 | 83 | 157.1 | 85.1 | 953 | 7.8 |
| Preparation Example 14 | 7.8 | 0.6 | −1.95 | 2.47 | 87 | 155.4 | 85.2 | 1067 | 6.9 |
| Preparation Example 15 | 6.4 | 0.5 | −1.97 | 2.49 | 86 | 156.4 | 82.1 | 938 | 7.5 |
| Preparation Example 16 | 5.4 | 0.7 | −1.94 | 2.44 | 86 | 156.1 | 87.3 | 927 | 8.4 |
| Preparation Example 17 | 4.2 | 0.6 | −1.98 | 2.42 | 88 | 156.5 | 92.1 | 919 | 7.5 |
| Preparation Example 18 | 2.5 | 0.4 | −1.96 | 2.46 | 84 | 157.4 | 94.0 | 1057 | 6.4 |
| Preparation Example 19 | 2.4 | 0.4 | −1.97 | 2.47 | 84 | 156.8 | 94.4 | 1064 | 6.7 |
| Preparation Example 20 | 2.6 | 0.4 | −1.95 | 2.45 | 86 | 154.8 | 93.7 | 975 | 7.3 |
| Preparation Example 21 | 3.3 | 0.5 | −1.93 | 2.46 | 82 | 155.7 | 91.5 | 989 | 6.3 |
| Preparation Example 22 | 3.1 | 0.5 | −1.95 | 2.46 | 75 | 157.3 | 91.6 | 964 | 6.3 |
| Preparation Example 23 | 2.8 | 0.6 | −1.96 | 2.44 | 67 | 151.8 | 84.4 | 864 | 5.9 |
| Preparation Example 24 | 2.5 | 0.5 | −1.97 | 2.45 | 65 | 152.3 | 90.2 | 976 | 5.6 |
| Preparation Example 25 | 2.2 | 0.4 | −1.98 | 2.46 | 58 | 153.3 | 92.2 | 986 | 5.2 |
| Preparation Example 26 | 3.4 | 0.6 | −1.95 | 2.25 | 45 | 147.3 | 92.5 | 978 | 9.3 |
| Preparation Example 27 | 2.7 | 0.5 | −1.98 | 2.28 | 42 | 145.8 | 91.8 | 937 | 10.5 |

TABLE 8

Performance data of positive electrode active materials of preparation examples 28-41, or button battery or full battery measured according to above-mentioned performance test methods

| | Lattice change rate (%) | Li/Mn antisite defect concentration | Surface oxygen valence | Compacted density (g/cm³) | Dissolution of Mn and Fe after cycling (ppm) | Initial gram capacity of button battery (mAh/g) | Capacity rate of constant-current charged at 3 C (%) | Cycle number for 80% of capacity retention rate at 45° C. | Battery cell expansion rate (%) after storage at 60° C. |
|---|---|---|---|---|---|---|---|---|---|
| Preparation Example 28 | 7.8 | 5.6 | −1.59 | 1.89 | 341 | 138.1 | 53.1 | 594 | 24.1 |
| Preparation Example 29 | 7.4 | 4.8 | −1.62 | 1.94 | 279 | 140.3 | 55.6 | 628 | 22.4 |
| Preparation Example 30 | 7.2 | 4.5 | −1.66 | 1.98 | 248 | 141.5 | 56.8 | 689 | 21.6 |
| Preparation Example 31 | 7.1 | 4.1 | −1.68 | 2.01 | 216 | 142.3 | 57.5 | 721 | 18.7 |
| Preparation Example 32 | 6.8 | 3.8 | −1.71 | 2.04 | 184 | 143.8 | 59.3 | 749 | 15.6 |

TABLE 8-continued

Performance data of positive electrode active materials of preparation examples 28-41, or button battery or full battery measured according to above-mentioned performance test methods

|  | Lattice change rate (%) | Li/Mn antisite defect concentration | Surface oxygen valence | Compacted density (g/cm³) | Dissolution of Mn and Fe after cycling (ppm) | Initial gram capacity of button battery (mAh/g) | Capacity rate of constant-current charged at 3 C (%) | Cycle number for 80% of capacity retention rate at 45° C. | Battery cell expansion rate (%) after storage at 60° C. |
|---|---|---|---|---|---|---|---|---|---|
| Preparation Example 33 | 6.7 | 3.4 | −1.75 | 2.06 | 176 | 144.2 | 61.4 | 756 | 11.3 |
| Preparation Example 34 | 6.6 | 3.1 | −1.76 | 2.08 | 139 | 148.2 | 62.6 | 787 | 10.8 |
| Preparation Example 35 | 6.4 | 2.7 | −1.76 | 2.13 | 126 | 149.8 | 63.8 | 816 | 9.6 |
| Preparation Example 36 | 6.4 | 1.9 | −1.77 | 2.15 | 103 | 152.3 | 65.4 | 937 | 8.9 |
| Preparation Example 37 | 6.4 | 1.4 | −1.84 | 2.27 | 89 | 157.2 | 69.1 | 982 | 8.2 |
| Preparation Example 38 | 6.5 | 1.8 | −1.78 | 2.16 | 113 | 153.9 | 66.3 | 921 | 9.1 |
| Preparation Example 39 | 6.8 | 2.7 | −1.76 | 2.12 | 134 | 152.1 | 64.5 | 998 | 9.8 |
| Preparation Example 40 | 7.1 | 3.4 | −1.74 | 2.08 | 161 | 150.2 | 63.4 | 926 | 10.5 |
| Preparation Example 41 | 7.8 | 4.5 | −1.70 | 2.03 | 189 | 148.1 | 61.3 | 837 | 11.8 |

TABLE 9

Performance data of positive electrode active materials of preparation examples 42-54, or button battery or full battery measured according to above-mentioned performance test methods

|  | Lattice change rate (%) | Li/Mn antisite defect concentration | Surface oxygen valence | Compacted density (g/cm³) | Dissolution of Mn and Fe after cycling (ppm) | Initial gram capacity of button battery (mAh/g) | Capacity rate of constant-current charged at 3 C (%) | Cycle number for 80% of capacity retention rate at 45° C. | Battery cell expansion rate (%) after storage at 60° C. |
|---|---|---|---|---|---|---|---|---|---|
| Preparation Example 42 | 6.5 | 2.8 | −1.80 | 2.19 | 95 | 155.7 | 67.3 | 519 | 10.3 |
| Preparation Example 43 | 6.7 | 2.6 | −1.81 | 2.18 | 88 | 156.1 | 67.6 | 525 | 9.8 |
| Preparation Example 44 | 6.8 | 2.7 | −1.83 | 2.20 | 91 | 155.5 | 67.5 | 522 | 10.1 |
| Preparation Example 45 | 6.7 | 2.6 | −1.82 | 2.17 | 85 | 155.9 | 67.4 | 517 | 9.5 |
| Preparation Example 46 | 6.4 | 2.5 | −1.83 | 2.18 | 134 | 150.9 | 61.4 | 501 | 11.6 |
| Preparation Example 47 | 6.1 | 2.1 | −1.81 | 2.21 | 114 | 152.8 | 63.7 | 518 | 10.8 |
| Preparation Example 48 | 6.6 | 1.8 | −1.79 | 2.23 | 105 | 154.3 | 65.4 | 538 | 9.2 |
| Preparation Example 49 | 6.4 | 1.4 | −1.85 | 2.22 | 95 | 156.6 | 68.4 | 572 | 8.7 |
| Preparation Example 50 | 7.5 | 3.4 | −1.75 | 2.08 | 115 | 149.5 | 58.3 | 426 | 9.6 |
| Preparation Example 51 | 6.5 | 1.5 | −1.83 | 2.21 | 95 | 155.8 | 67.5 | 531 | 8.8 |

TABLE 9-continued

Performance data of positive electrode active materials of preparation examples 42-54, or button battery or full battery measured according to above-mentioned performance test methods

| | Lattice change rate (%) | Li/Mn antisite defect concentration | Surface oxygen valence | Compacted density (g/cm$^3$) | Dissolution of Mn and Fe after cycling (ppm) | Initial gram capacity of button battery (mAh/g) | Capacity rate of constant-current charged at 3 C (%) | Cycle number for 80% of capacity retention rate at 45° C. | Battery cell expansion rate (%) after storage at 60° C. (%) |
|---|---|---|---|---|---|---|---|---|---|
| Preparation Example 52 | 6.8 | 1.4 | −1.81 | 2.23 | 101 | 154.6 | 66.9 | 518 | 7.4 |
| Preparation Example 53 | 6.6 | 1.6 | −1.82 | 2.24 | 118 | 155.3 | 67.2 | 508 | 7.9 |
| Preparation Example 54 | 8.7 | 2.4 | −1.79 | 2.17 | 129 | 152.3 | 65.4 | 483 | 11.2 |

It can be seen from the above tables 5, 7, 8, and 9 that each positive electrode active material of the preparation examples of the present application has achieved the better effect than the comparative examples in one or even all aspects of cycling performance, high-temperature stability, gram capacity and compacted density.

From the comparison between preparation examples 18-20 and 23-25, it can be seen that in the case of the same other elements, (1-y): y is in the range of 1 to 4, which can further improve the energy density and cycling performance of the secondary battery.

II. Battery Test

Secondary batteries prepared by adopting positive electrode sheets P1-P42 were tested as follows:

(1) According to a method in the national standard GB 38031-2020 "Electric Vehicles Traction Battery Safety Requirements", energy density and furnace temperature experiment results of the secondary batteries were measured;

(2) Puncture test: the secondary batteries were fully charged to 100% SOC, battery cells were punctured with a Φ8 mm steel needle at a speed of 25 mm/2, observation was carried out for 1 h, and if no fire occurs, the test was passed;

(3) According to the national standard GBT31486-2015 "Electrical Performance Requirements and Test Methods for Traction Battery of Electric Vehicle", a charge capacity retention rate and a low-temperature discharge capacity retention rate of the secondary batteries at the room temperature 1 C were measured to obtain kinetic data of the batteries;

(4) According to the national standard GBT31484-2015 "Cycle Life Requirements and Test Methods for Traction Battery of Electric Vehicle", cycle life data of the secondary batteries was measured;

The above results are shown in Table 10

TABLE 10

Battery test results

| Positive electrode sheet for battery cell | Energy density (Wh/L) | | Energy density (Wh/kg) | | Furnace temperature experiment | Puncture experiment | Charge capacity retention rate at room temperature 1 C. (Vs 0.33 C.) | Cycle life, Cycles (80% SOH, 25° C.) | −20° C., discharge capacity retention rate at 0.33 C. |
|---|---|---|---|---|---|---|---|---|---|
| Positive electrode sheet P1 | 431.4 | BASE | 191.3 | BASE | PASS | PASS | 84% | 3000 | 70% |
| Positive electrode sheet P2 | 567.7 | ↑32% | 228.5 | ↑19% | Catch fire | Catch fire | 100% | 2000 | 80% |
| Positive electrode sheet P3 | 476.7 | ↑10% | 209.8 | ↑10% | PASS | PASS | 92% | 2540 | 71% |
| Positive electrode sheet P4 | 508.6 | ↑18% | 212.8 | ↑11% | PASS | PASS | 92% | 2570 | 71% |
| Positive electrode sheet P5 | 454.4 | ↑5% | 200.6 | ↑5% | PASS | PASS | 87% | 2820 | 73% |
| Positive electrode sheet P6 | 526.7 | ↑22% | 215.8 | ↑13% | PASS | PASS | 97% | 2360 | 79% |
| Positive electrode sheet P7 | 476.7 | ↑10% | 209.8 | ↑10% | PASS | PASS | 91% | 2590 | 75% |
| Positive electrode sheet P8 | 476.7 | ↑10% | 209.8 | ↑10% | PASS | PASS | 91% | 2470 | 73% |
| Positive electrode sheet P9 | 454.4 | ↑5% | 200.6 | ↑5% | PASS | PASS | 88% | 2970 | 72% |
| Positive electrode sheet P10 | 467.4 | ↑8% | 201.3 | ↑5% | PASS | PASS | 88% | 2580 | 72% |
| Positive electrode sheet P11 | 526.7 | ↑22% | 215.8 | ↑13% | PASS | PASS | 95% | 2070 | 79% |
| Positive electrode sheet P12 | 526.7 | ↑22% | 215.8 | ↑13% | PASS | PASS | 96% | 2270 | 76% |

TABLE 10-continued

Battery test results

| Positive electrode sheet for battery cell | Energy density (Wh/L) | | Energy density (Wh/kg) | | Furnace temperature experiment | Puncture experiment | Charge capacity retention rate at room temperature 1 C. (Vs 0.33 C.) | Cycle life, Cycles (80% SOH, 25° C.) | −20° C., discharge capacity retention rate at 0.33 C. |
|---|---|---|---|---|---|---|---|---|---|
| Positive electrode sheet P13 | 454.4 | ↑5% | 200.6 | ↑5% | PASS | PASS | 89% | 2740 | 71% |
| Positive electrode sheet P14 | 456.1 | ↑6% | 200.7 | ↑5% | PASS | PASS | 94% | 2300 | 77% |
| Positive electrode sheet P15 | 476.7 | ↑10% | 209.8 | ↑10% | PASS | PASS | 92% | 2450 | 74% |
| Positive electrode sheet P16 | 454.4 | ↑5% | 200.6 | ↑5% | PASS | PASS | 89% | 2660 | 72% |
| Positive electrode sheet P17 | 526.7 | ↑22% | 215.8 | ↑13% | PASS | PASS | 96% | 2430 | 78% |
| Positive electrode sheet P18 | 508.6 | ↑18% | 212.8 | ↑11% | PASS | PASS | 92% | 2600 | 75% |
| Positive electrode sheet P19 | 445.4 | ↑3% | 196.9 | ↑3% | PASS | PASS | 86% | 2860 | 71% |
| Positive electrode sheet P20 | 479.4 | ↑11% | 210.9 | ↑10% | PASS | PASS | 93% | 2360 | 78% |
| Positive electrode sheet P21 | 462.0 | ↑7% | 204.0 | ↑7% | PASS | PASS | 91% | 2640 | 72% |
| Positive electrode sheet P22 | 445.4 | ↑3% | 196.9 | ↑3% | PASS | PASS | 86% | 2840 | 73% |
| Positive electrode sheet P23 | 511.4 | ↑19% | 212.2 | ↑11% | PASS | PASS | 94% | 2450 | 78% |
| Positive electrode sheet P24 | 481.9 | ↑12% | 204.8 | ↑7% | PASS | PASS | 90% | 2690 | 75% |
| Positive electrode sheet P25 | 462.0 | ↑7% | 204.0 | ↑7% | PASS | PASS | 89% | 2660 | 71% |
| Positive electrode sheet P26 | 540.6 | ↑25% | 219.2 | ↑15% | PASS | PASS | 97% | 1920 | 77% |
| Positive electrode sheet P27 | 511.4 | ↑19% | 212.2 | ↑11% | PASS | PASS | 95% | 2390 | 78% |
| Positive electrode sheet P28 | 462.0 | ↑7% | 204.0 | ↑7% | PASS | PASS | 89% | 2650 | 70% |
| Positive electrode sheet P29 | 540.6 | ↑25% | 219.2 | ↑15% | PASS | PASS | 98% | 2020 | 80% |
| Positive electrode sheet P30 | 511.4 | ↑19% | 212.2 | ↑11% | PASS | PASS | 93% | 2450 | 77% |
| Positive electrode sheet P31 | 567.7 | ↑32% | 228.5 | ↑19% | Catch fire | Catch fire | 100% | 2100 | 79% |
| Positive electrode sheet P32 | 567.7 | ↑32% | 228.5 | ↑19% | Catch fire | Catch fire | 100% | 1600 | 80% |
| Positive electrode sheet P33 | 567.7 | ↑32% | 228.5 | ↑19% | Catch fire | Catch fire | 100% | 1500 | 79% |
| Positive electrode sheet P34 | 567.7 | ↑32% | 228.5 | ↑19% | Catch fire | Catch fire | 100% | 1300 | 80% |
| Positive electrode sheet P35 | 567.7 | ↑32% | 228.5 | ↑19% | Catch fire | Catch fire | 100% | 1100 | 79% |
| Positive electrode sheet P36 | 567.7 | ↑32% | 228.5 | ↑19% | Catch fire | Catch fire | 100% | 1000 | 80% |
| Positive electrode sheet P37 | 508.6 | ↑18% | 212.8 | ↑11% | PASS | PASS | 92% | 2570 | 75% |
| Positive electrode sheet P38 | 508.6 | ↑18% | 212.8 | ↑11% | PASS | PASS | 93% | 2320 | 73% |
| Positive electrode sheet P39 | 508.6 | ↑18% | 212.8 | ↑11% | PASS | PASS | 92% | 2240 | 73% |
| Positive electrode sheet P40 | 508.6 | ↑18% | 212.8 | ↑11% | PASS | PASS | 93% | 2210 | 77% |
| Positive electrode sheet P41 | 508.6 | ↑18% | 212.8 | ↑11% | PASS | PASS | 91% | 1900 | 76% |
| Positive electrode sheet P42 | 508.6 | ↑18% | 212.8 | ↑11% | PASS | PASS | 91% | 2120 | 75% |

According to the above results, it can be seen that:

Compared with the secondary battery using the positive electrode sheet P1, the secondary batteries using the positive electrode sheets P3-P30 and P37-P42 have higher energy density, higher room temperature charge capacity retention rate and higher low temperature discharge capacity retention rate, and smoothly pass the furnace temperature experiment and the puncture test; compared with the secondary batteries using the positive electrode sheets P3-P30, the secondary battery using the positive electrode sheet P2 fails to pass the furnace temperature experiment and the puncture test, a fire occurs during the test, and moreover, the secondary batteries using the positive electrode sheets P3-25 and the positive electrode sheets P27-P30 have the longer cycle life than that of the secondary battery using the positive electrode sheet P2; compared with the secondary batteries using the positive electrode sheets P37-P42, the secondary batteries using the positive electrode sheets P31-P36 fail to pass the furnace temperature experiment and the puncture test, and a fire occurs during the test; and the positive electrode sheets P37-P42 comprise a first positive electrode active material and a second positive electrode active material, the positive electrode sheets P31-P36 comprise an equivalent amount of second positive electrode active material correspondingly, and it can be seen that the secondary batteries adopting the positive electrode sheets comprising the first positive electrode active material and the second positive electrode active material have the longer cycle life than the secondary batteries adopting the positive electrode sheets only comprising the second positive electrode active material.

The above shows that the secondary batteries made of the positive electrode sheets of the present application have the higher energy density, the higher battery cell rate performance, the better kinetic performance and low-temperature performance, the longer cycle life, and the higher safety.

It should be noted that the present application is not limited to the embodiments above. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A positive electrode sheet, comprising a positive electrode current collector, a positive electrode film layer I and a positive electrode film layer II, wherein the positive electrode film layer I is on a surface of the positive electrode current collector and the positive electrode film layer II is on the opposite surface of the positive electrode current collector; wherein:
   a) the positive electrode film layer I is a single layer structure and the positive electrode film layer II is a single layer structure; or
   b) the positive electrode film layer I is a two layer structure and the positive electrode film layer II is a single layer structure; or
   c) the positive electrode film layer I is a single layer structure and the positive electrode film layer II is a two layer structure; or
   d) the positive electrode film layer I is a two layer structure and the positive electrode film layer II is a two layer structure;
   wherein one layer of the positive electrode film layer I comprises a first positive electrode active material that comprises particles selected from one or more of 
   wherein,
   A comprises one or more elements selected from the group consisting of Zn, Al, Na, K, Mg, Nb, Mo and W,
   R comprises one or more elements selected from the group consisting of Ti, V, Zr, Fe, Ni, Mg, Co, Ga, Sn, Sb, Nb and Ge,
   C comprises one or more elements selected from the group consisting of B, S, Si and N,
   D comprises one or more elements selected from the group consisting of S, F, Cl and Br,
   a is selected from a range of 0.9 to 1.1, x is selected from a range of 0.001 to 0.1, y is selected from a range of 0.001 to 0.5, z is selected from a range of 0.001 to 0.1, and n is selected from a range of 0.001 to 0.1;
   wherein
   one layer of the positive electrode film layer II comprises a second positive electrode active material that comprises particles selected from one or more of the group consisting of $LiNi_bCo_cMn_{(1-b-c)}O_2$, $LiNi_bCo_cAl_{(1-b-c)}O_2$ and $LiCoO_2$; wherein b is independently selected from 0.3-0.9, and a sum of b and c is independently selected from 0.3-0.9;
   wherein when the positive electrode film layer I, the positive electrode film layer II or both comprise two layers, one layer comprises the first positive electrode active material and the other layer comprises the second positive electrode active material.

2. The positive electrode sheet according to claim 1, wherein a mass ratio of the first active material in the positive electrode film layer I to the second active material in the positive electrode film layer II is 1:7 to 7:1.

3. The positive electrode sheet according to claim 1, wherein in the first positive electrode active material,
   R is selected from at least two elements selected from the group consisting of Ti, V, Zr, Fe, Ni, Mg, Co, Ga, Sn, Sb, Nb and Ge;
   A is Mg or Nb, and/or,
   C is S, and/or,
   D is F.

4. The positive electrode sheet according to claim 3, wherein in the first positive electrode active material,
   R is at least two elements selected from the group consisting of Ti, V, Fe, Mg and Co.

5. The positive electrode sheet according to claim 1, wherein in the first positive electrode active material, x is selected from a range of 0.001-0.005; and/or, y is selected from a range of 0.01 to 0.5; and/or, z is selected from a range of 0.001 to 0.005; and/or, n is selected from a range of 0.001 to 0.005; and/or, a ratio of (1-y) to y is selected from 1-4; and/or, a ratio of a to x is selected from 9-1100.

6. The positive electrode sheet according to claim 1, wherein in the second positive electrode active material,
   a ratio of b to (1-b-c) to c in $LiNi_bCo_cMn_{(1-b-c)}O_2$ is 5:2:3 or 3:1:1 or 8:1:1; or,
   a ratio of b to c to (1-b-c) in $LiNi_bCo_cAl_{(1-b-c)}O_2$ is 5:2:3 or 3:1:1 or 8:1:1.

7. The positive electrode sheet according to claim 1, wherein a sum of mass of the first positive electrode active material and the second positive electrode active material accounts for 88%-98.7% of the mass of the positive electrode sheet.

8. The positive electrode sheet according to claim 1, wherein a lattice change rate of the first positive electrode active material is about 2.2 to 8%.

9. The positive electrode sheet according to claim 1, wherein a Li/Mn antisite defect concentration of the first positive electrode active material is about 0.4 to 2%.

10. The positive electrode sheet according to claim 1, wherein surface oxygen valence of the first positive electrode active material is about −1.82- to −1.98.

11. The positive electrode sheet according to claim 1, wherein a compacted density of the first positive electrode active material at 3T is 2.0 g/cm$^3$ or more.

12. The positive electrode sheet according to claim 1, wherein a surface of the particles of the first positive electrode active material is further coated with carbon.

13. A secondary battery, comprising the positive electrode sheet according to claim 1.

14. A battery module, comprising the secondary battery according to claim 13.

15. A battery pack, comprising the battery module according to claim 14.

16. An electrical apparatus, comprising at least one of the secondary battery according to claim 13.

* * * * *